(12) United States Patent
Sabry et al.

(10) Patent No.: US 9,429,474 B2
(45) Date of Patent: Aug. 30, 2016

(54) FOURIER TRANSFORM MICRO SPECTROMETER BASED ON SPATIALLY-SHIFTED INTERFEROGRAM BURSTS

(71) Applicant: Si-Ware Systems, Cairo (EG)

(72) Inventors: Yasser M. Sabry, Cairo (EG); Diaa A. M. Khalil, Cairo (EG); Bassam A. Saadany, Cairo (EG)

(73) Assignee: SI-WARE SYSTEMS, Cairo (EG)

( * ) Notice: Subject to any disclaimer, the term of this patent is extended or adjusted under 35 U.S.C. 154(b) by 117 days.

(21) Appl. No.: 14/047,681

(22) Filed: Oct. 7, 2013

(65) Prior Publication Data

US 2014/0098371 A1 Apr. 10, 2014

Related U.S. Application Data

(60) Provisional application No. 61/710,873, filed on Oct. 8, 2012.

(51) Int. Cl.
| | |
|---|---|
| *G01J 3/45* | (2006.01) |
| *G01J 3/02* | (2006.01) |
| *G01J 3/26* | (2006.01) |
| G01J 3/453 | (2006.01) |

(52) U.S. Cl.
CPC ............... *G01J 3/45* (2013.01); *G01J 3/0218* (2013.01); *G01J 3/0256* (2013.01); *G01J 3/26* (2013.01); *G01J 3/4535* (2013.01); *G01J 2003/4538* (2013.01)

(58) Field of Classification Search
CPC .............. G01J 3/0256; G01J 3/0218; G01J 3/453–2003/4538; G01J 3/45
See application file for complete search history.

(56) References Cited

U.S. PATENT DOCUMENTS

| | | | | |
|---|---|---|---|---|
| 3,373,651 | A | * | 3/1968 | Mack et al. ................. 356/454 |
| 3,984,190 | A | * | 10/1976 | Barrett et al. ............... 356/454 |
| 4,525,067 | A | | 6/1985 | Hernandez |
| 4,674,125 | A | * | 6/1987 | Carlson et al. .............. 382/303 |
| 5,357,340 | A | * | 10/1994 | Zochbauer ................... 356/454 |
| 5,682,237 | A | | 10/1997 | Belk |
| 6,061,582 | A | | 5/2000 | Small et al. |
| 6,747,742 | B1 | | 6/2004 | Verma |
| 7,554,667 | B1 | * | 6/2009 | Kampe ........................ 356/454 |
| 7,844,145 | B1 | | 11/2010 | Waters |
| 2005/0237538 | A1 | * | 10/2005 | Belleville .................... 356/504 |

(Continued)

FOREIGN PATENT DOCUMENTS

| | | |
|---|---|---|
| DE | 4431412 | 3/1996 |
| EP | 0457484 | 11/1991 |

(Continued)

OTHER PUBLICATIONS

International Searching Authority; International Search Report and Written Opinion; International Application No. PCT/US13/63816; Sep. 23, 2014; 20 pgs.

(Continued)

*Primary Examiner* — Michael P LaPage
(74) *Attorney, Agent, or Firm* — Holly Rudnick; Loza & Loza, LLP

(57) ABSTRACT

A spectrometer with improved resolution includes a spectral domain modulator having a periodic response in the spectral domain to modulate a wideband source spectrum and cause one or more shifted bursts in the interferogram.

28 Claims, 21 Drawing Sheets

(56) References Cited

U.S. PATENT DOCUMENTS

2008/0158568 A1    7/2008   Claydon et al.
2010/0097613 A1*   4/2010   Saari .......................... 356/454
2010/0097614 A1*   4/2010   Kourogi et al. ............. 356/477

FOREIGN PATENT DOCUMENTS

| EP | 1052484 | 11/2000 |
|----|---------|---------|
| WO | 9817968 | 4/1998 |
| WO | 2007072428 A2 | 6/2007 |

OTHER PUBLICATIONS

International Searching Authority; International Search Report and Written Opinion; International Application No. PCT/US13/63816; Feb. 7, 2014; 19 pgs.

Davis et al.; Function Guide for the Fourier Transformation Package; SPIRE-UOL-REP-002220; Function Guide for the Fourier Transformation Package; Aug. 16, 2005; 18 pgs; No. V1.1.

* cited by examiner

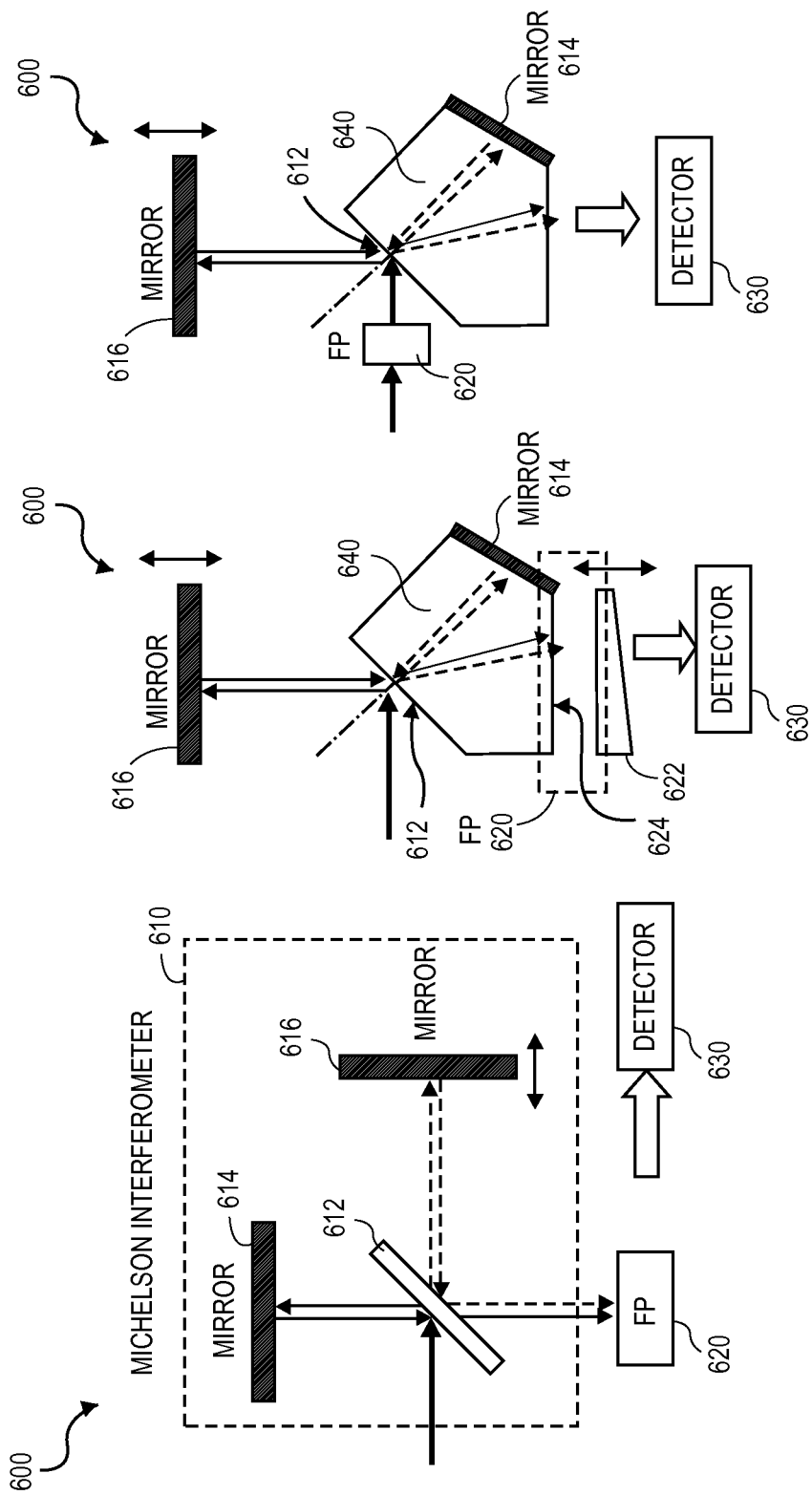

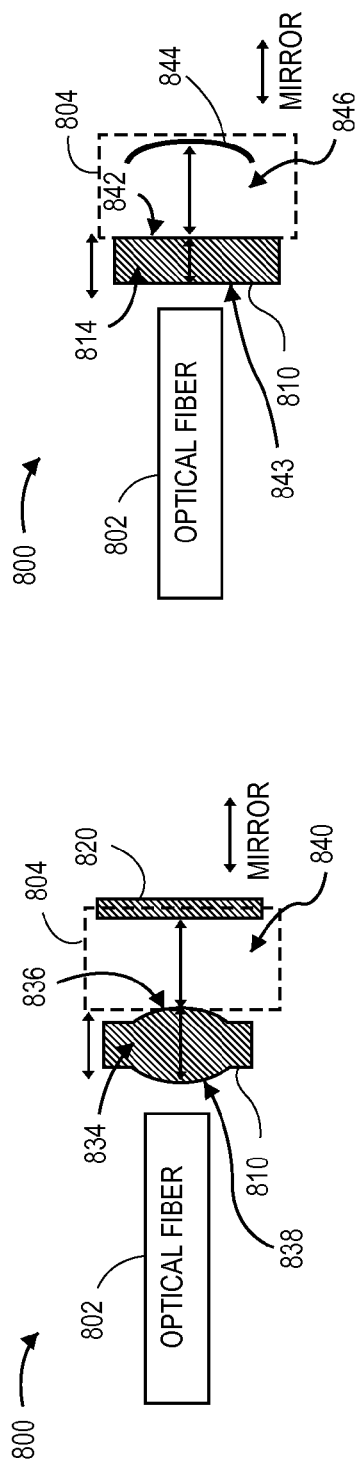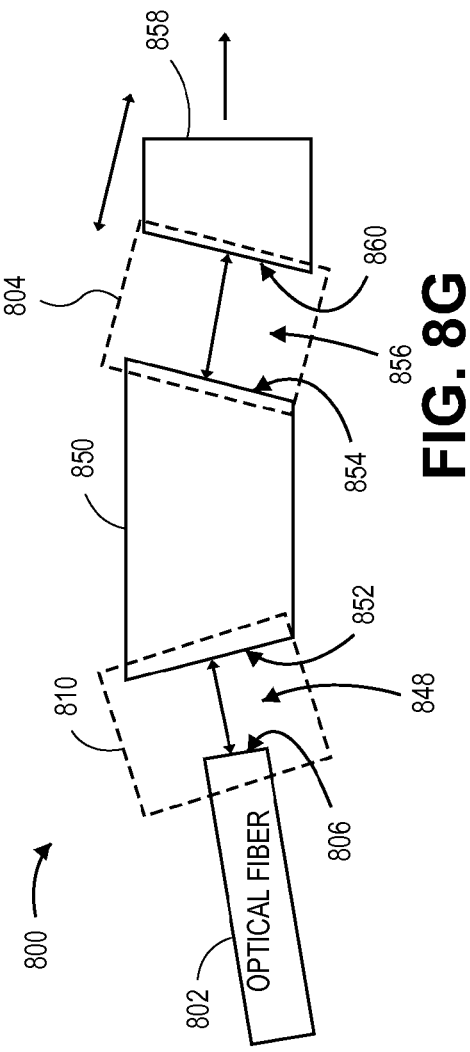

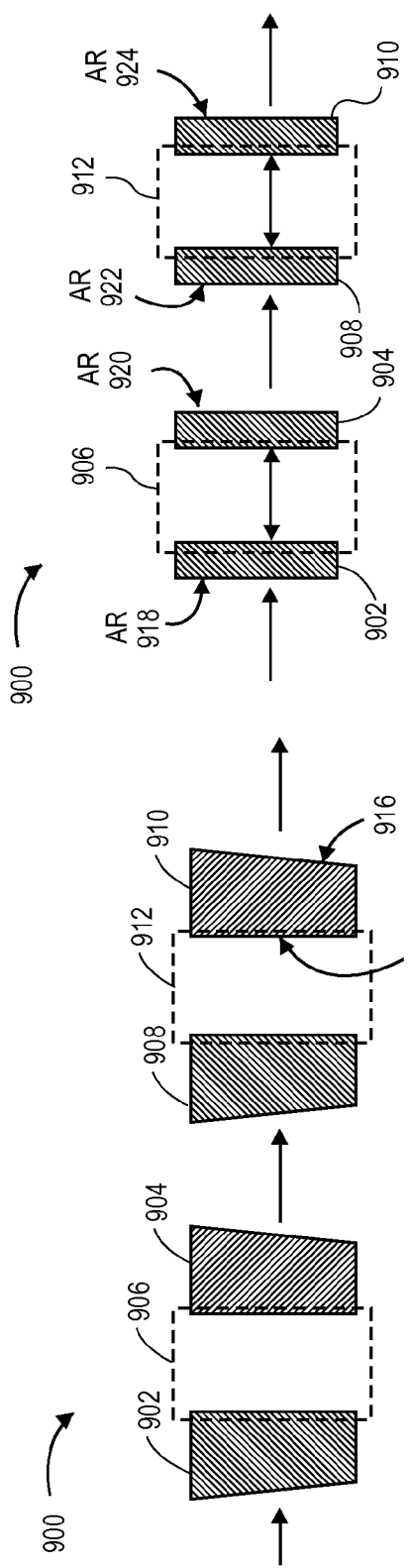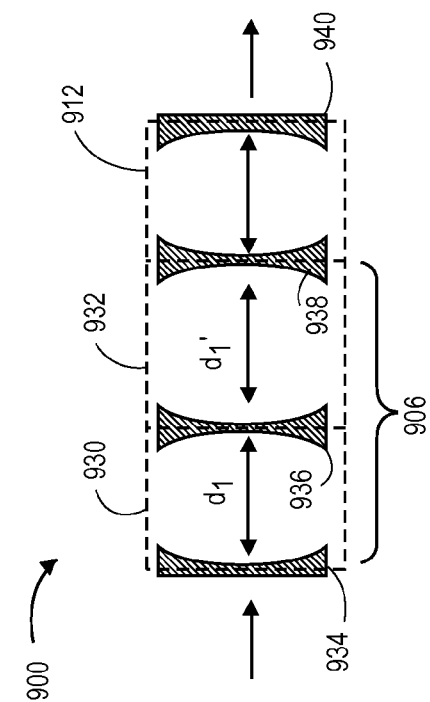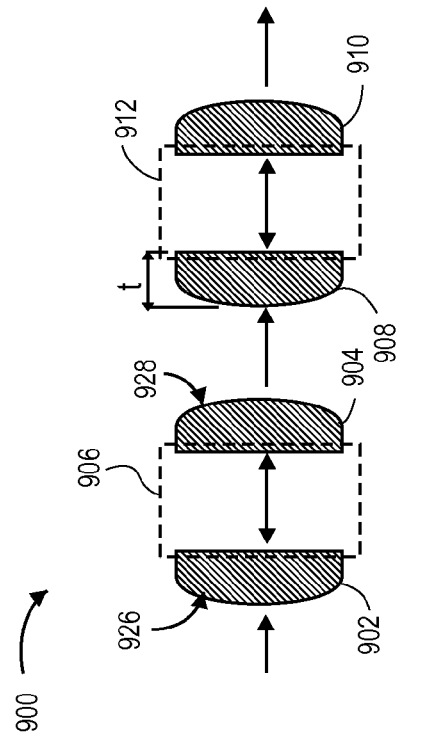

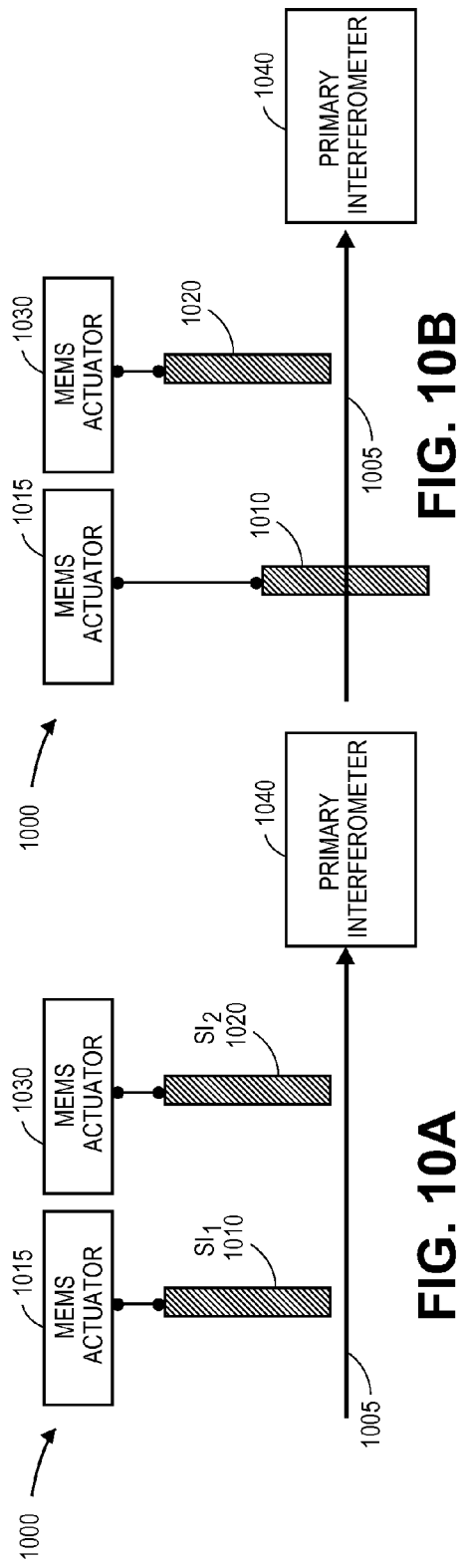
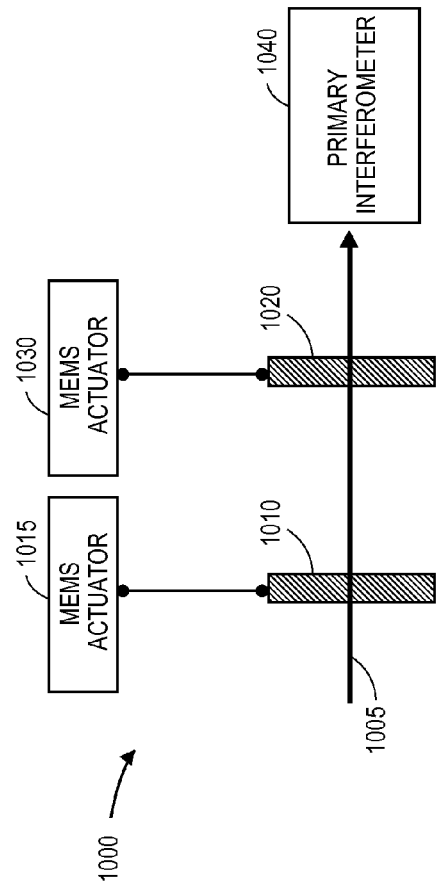
FIG. 10A
FIG. 10B
FIG. 10C

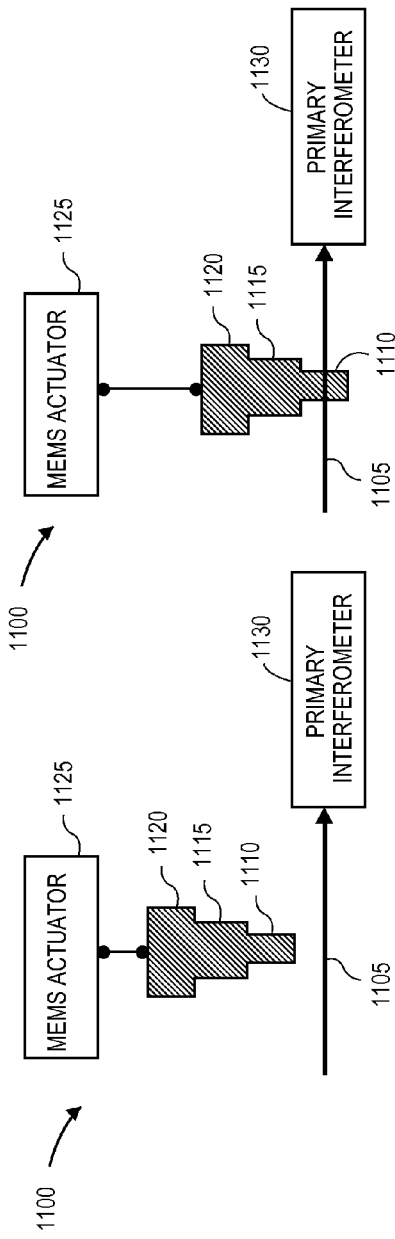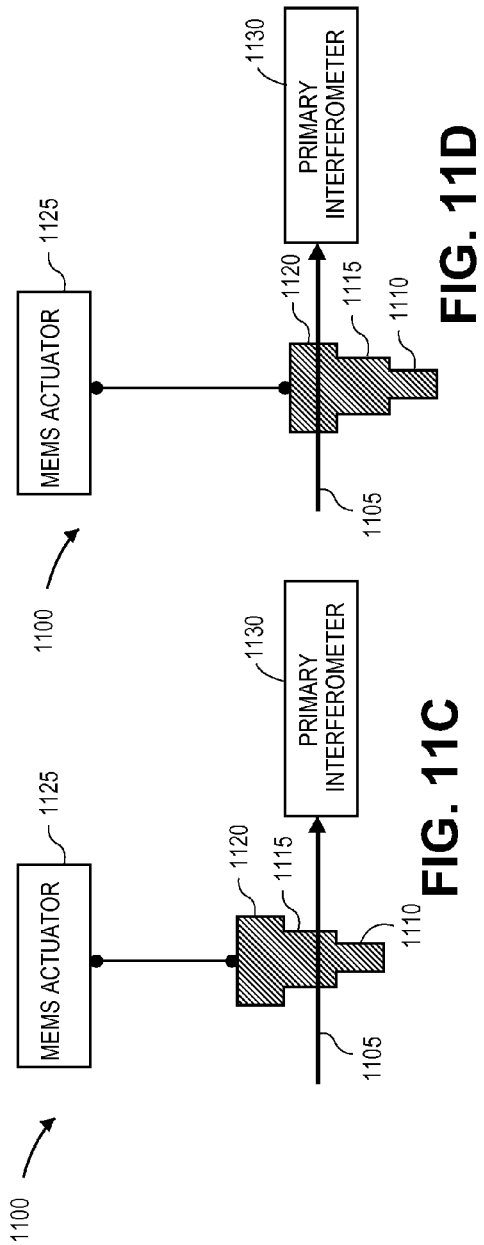
FIG. 11A
FIG. 11B
FIG. 11C
FIG. 11D

FOURIER TRANSFORM MICRO SPECTROMETER BASED ON SPATIALLY-SHIFTED INTERFEROGRAM BURSTS

CROSS REFERENCE TO RELATED PATENTS

The present U.S. Utility patent application claims priority pursuant to 35 U.S.C. §119(e) to the following U.S. Provisional Patent Application(s) which are hereby incorporated herein by reference in their entirety and made part of the present U.S. Utility patent application for all purposes:
1. U.S. Provisional Application Ser. No. 61/710,873, entitled "Fourier Transform Micro Spectrometer Based on Spatially-Shifted Interferogram Bursts,", filed Oct. 8, 2012.

BACKGROUND OF THE INVENTION

1. Technical Field of the Invention

The present invention relates in general to spectrometers, and in particular to Fourier Transform micro spectrometers.

2. Description of Related Art

Absorption spectrometers measure how well a sample absorbs light at each wavelength. Most absorption spectrometers utilize a "dispersive spectroscopy" technique, but others utilize a "Fourier transform spectroscopy" technique. The main difference between a Fourier transform (FT) spectrometer and other dispersive-type spectrometers (or spectrometers based on tunable wide-free-spectral-range high-finesse Fabry-Perot filters) is that an FT spectrometer measures all the wavelengths coincidentally, while other types of spectrometers measure one wavelength a time. As a result, FT spectrometers have higher measuring speeds and larger signal to noise ratios than dispersive spectrometers.

FT spectrometers are usually based on Michelson interferometers, in which collimated light from a broadband source is split into two beams, which are then reflected off of respective mirrors (one of which is moving) and caused to interfere, allowing the temporal coherence of the light to be measured at each different Optical Path Difference (OPD) offered by the moving mirror. The resulting signal, called the interferogram, is measured by a detector at many discrete positions of the moving mirror. The measured spectrum is retrieved using a Fourier transform carried out by a signal processor.

The interferogram of a single wavelength coherent source is periodic and varies with the OPD by a cosine function. Ideally, measuring any part of the interferogram would result in the same spectrum. Broadband sources, however, have most of the interferogram power concentrated around the zero OPD. Therefore, the moving mirror travel range should cover this portion of the interferogram. This is usually achieved by letting the respective distances between the beam splitter and each of the mirrors be equal (or close to it) and moving the mirror such that the distance between the beam splitter and the moving mirror assumes both negative and positive values with respect to the OPD position resulting in the detection of a double-sided interferogram. The maximum travel range scanned by the moving mirror (i.e. actuator travel range) governs the resolving power of an FT spectrometer. The larger the travel range, the better the resolution such that the resolution is inversely proportional to the travel range.

Many versions of the FT spectrometer based on Michelson interferometry have been developed based on the motion of an in-plane mirror or out-of-plane mirror with respect to the substrate. FT spectrometers based on Fabry-Perot (FP) interferometers, instead of Michelson interferometers, have also been developed. However, in FP-based FT spectrometers, the zero OPD can be achieved only by bringing the two optical surfaces in physical contact, which is impractical especially with actuation. Therefore, FP-based FT spectrometers are typically designed such that the partially reflective optical surfaces are left fixed in position but the gap between them has a varying function in space. The detector may then be composed of many small detectors (pixels) spread in space in order to capture the transverse interferogram (transverse with respect to the optical axis of the reflective optical surfaces) in a manner similar to imaging.

An FT spectrometer based on two FP interference transmission filters has also been developed in order to avoid the use of Michelson interferometry and it's mechanically moving parts. The two FP filter layer thicknesses may be set to the same value, and the optical layer thickness of one of them may be modulated by means of electro-optical, accousto-optical, thermo-optical or piezo-electrical methods without using moving parts. The use of the envelope of the transmission curve, resulting from the superposition of the airy functions of the two FP interference filters, enables the detection of the radiation flux starting from zero OPD and larger.

FT spectrometers based on Mach-Zehnder (MZ) interferometers can only achieve zero OPD between the two optical paths (OP1 and OP2) if different substances are used in the two paths. For example, a silicon half-plane beam splitter can be used such that the optical beam OP1 is in silicon and the other optical beam OP2 is in another substance. In this case, zero OPD can be achieved, but with restrictions on the size of the device. What is needed is a spectrometer with better compactness and improved resolution that can be monolithically integrated and is able to capture double-sided interferograms.

SUMMARY OF THE INVENTION

Embodiments of the present invention provide a spectrometer with improved resolution. The spectrometer includes a spectral domain modulator having a periodic response in the spectral domain to modulate a wideband source spectrum and cause one or more shifted bursts in the interferogram. The spectrometer can be very compact and monolithically integrated.

BRIEF DESCRIPTION OF THE DRAWINGS

A more complete understanding of the present invention may be obtained by reference to the following detailed description when taken in conjunction with the accompanying drawings wherein:

FIGS. 6A-6C illustrate exemplary spectrometers combining Michelson and Fabry-Perot interferometers, in accordance with embodiments of the present invention;

FIGS. 8A-8G illustrate exemplary spectrometers including Fabry-Perot interferometers formed with optical fibers and/or dielectric mirrors, in accordance with embodiments of the present invention;

FIGS. 9A-9D illustrate exemplary spectrometers including Fabry-Perot interferometers formed from dielectric mirrors, in accordance with embodiments of the present invention;

FIGS. 10A-10C illustrate an exemplary spectrometer including multiple auxiliary interferometers, in accordance with embodiments of the present invention;

FIGS. 11A-11D illustrate another exemplary spectrometer including multiple auxiliary interferometers, in accordance with embodiments of the present invention;

DETAILED DESCRIPTION OF THE DRAWINGS

In accordance with embodiments of the present invention, a spectrometer is provided with a spectral domain modulator that modulates the wideband source spectrum in the spectral domain before the generation of the interferogram. The interferogram generation is carried out using a primary interferometer, in which the interference path is varied using an actuator, such as a Micro Electro-Mechanical Systems (MEMS) actuator. In an exemplary embodiment, the spectral domain modulator includes one or more "secondary" (auxiliary) interferometers, which may or may not have their respective interference paths varied using MEMS actuators.

The usage of a spectral domain modulator causes a shift in the interferogram burst produced by the primary interferometer. This shift is exploited to overcome the limited travel range of MEMS actuators, extend the resolution of the spectrometer, retrieve the zero OPD information at the interferometer burst and capture double-sided interferograms, where the latter enables compensation of material-dispersion in the interferometers and makes the Fast Fourier Transform (FFT) independent of the exact form of the periodicity of spectral domain modulation. By this method also, a small area MEMS actuator with no stringent specification on the long travel range can be used, while the resolution of the spectrometer is not sacrificed. Michelson, Mach-Zehnder and/or Fabry Perot (FP) can be used, monolithically integrated, lithographically aligned and attached to MEMS actuators. In an exemplary embodiment, a correction algorithm is applied before or after the Fourier transform to remove harmonic components resulting from interferometer(s) non-idealities, such as multiple-beam interference.

Figure 1:
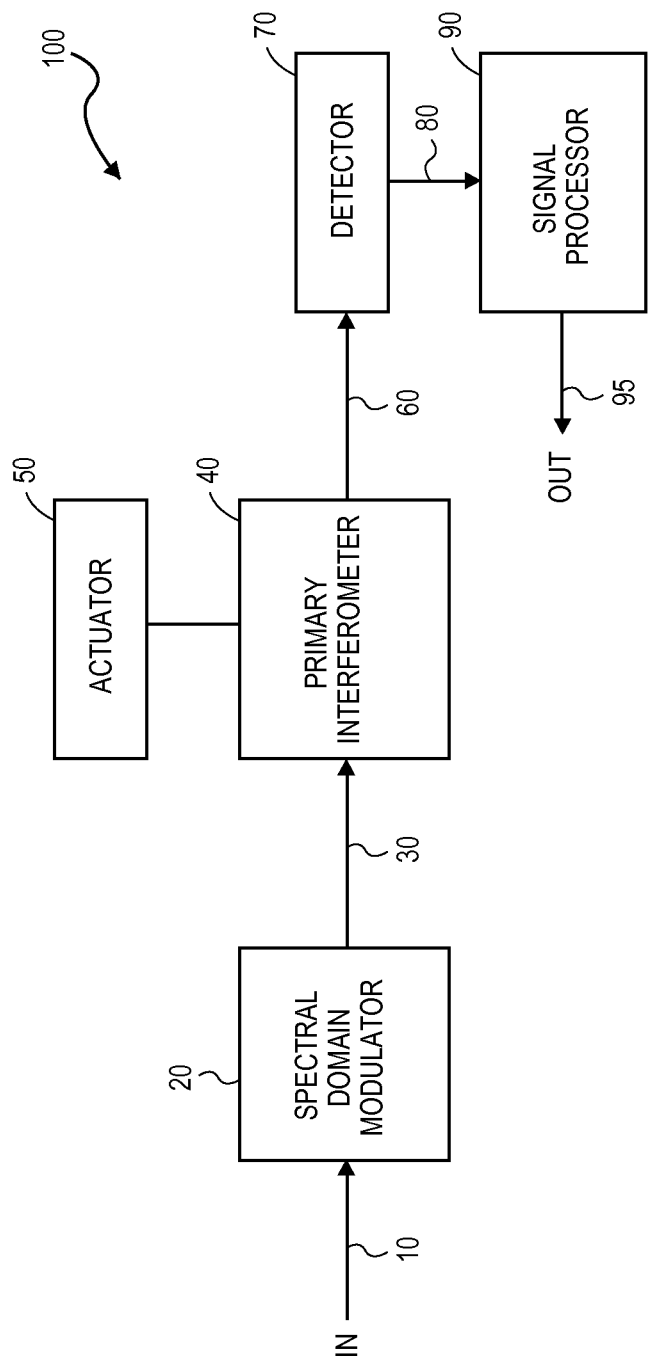
FIG. 1 is a block diagram illustrating exemplary components of a spectrometer, in accordance with embodiments of the present invention.

FIG. 1 is a block diagram illustrating exemplary components of a spectrometer 100, such as a Fourier transform micro spectrometer, in accordance with embodiments of the present invention. The spectrometer 100 includes a spectral domain modulator 20, primary interferometer 40, actuator 50, optical detector 70 and signal processor 90, which can collectively perform the functionality of a Fourier transform (FT) micro spectrometer. The term "micro spectrometer" is used herein generally to refer to a small form-factor spectrometer capable of measuring the spectrum of microscopic samples or microscopic areas of larger samples.

A wideband source spectrum 10 is received at the input of the spectrometer 100. The spectral domain modulator 20 has a periodic response in the spectral domain to modulate the wideband source spectrum 10 and produce a modulated wideband source spectrum 30. The primary interferometer 40 is optically coupled to receive the modulated wideband source spectrum 30 and operable to direct the modulated wideband source spectrum 30 along an optical path so as to produce an interference pattern 60 at an output of the primary interferometer 40. The primary interferometer 40 further includes at least one moveable element (such as a mirror) coupled to the actuator (e.g., a MEMS actuator), which causes a displacement of the at least one moveable element to vary the optical path. In an exemplary embodiment, the MEMS actuator may be an electrostatic actuator, such as a comb drive actuator, parallel plate actuator or other type of actuator.

The optical detector 70 is optically coupled to detect an interferogram 80 produced as a result of the interference pattern 60 and the displacement of the at least one moveable element in the primary interferometer 40. The spectral domain modulator 20 statically or dynamically shifts the burst of the interferogram 80 generated by the primary interferometer 40. Thus, as a result of the modulation produced by the spectral domain modulator 20, the interferogram 80 includes one or more shifted bursts, in which the number of shifted bursts and an amount of shift in each of the shifted bursts is determined based on the periodic response of the spectral domain modulator 20. The signal processor 90 applies a Fourier Transform to the interferogram 80 to retrieve the measured spectrum 95.

The signal processor 90 may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The signal processor 90 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

Although the spectral domain modulator 20 is shown before the primary interferometer 40 in the optical path of the wideband source spectrum, in other embodiments, the spectral domain modulator 20 may be positioned after the primary interferometer 40 in the optical path. In an exemplary embodiment, the spectral domain modulator 20 includes one or more auxiliary interferometers. However, in other embodiments, the spectral domain modulator 20 may include other components.

Figure 2:
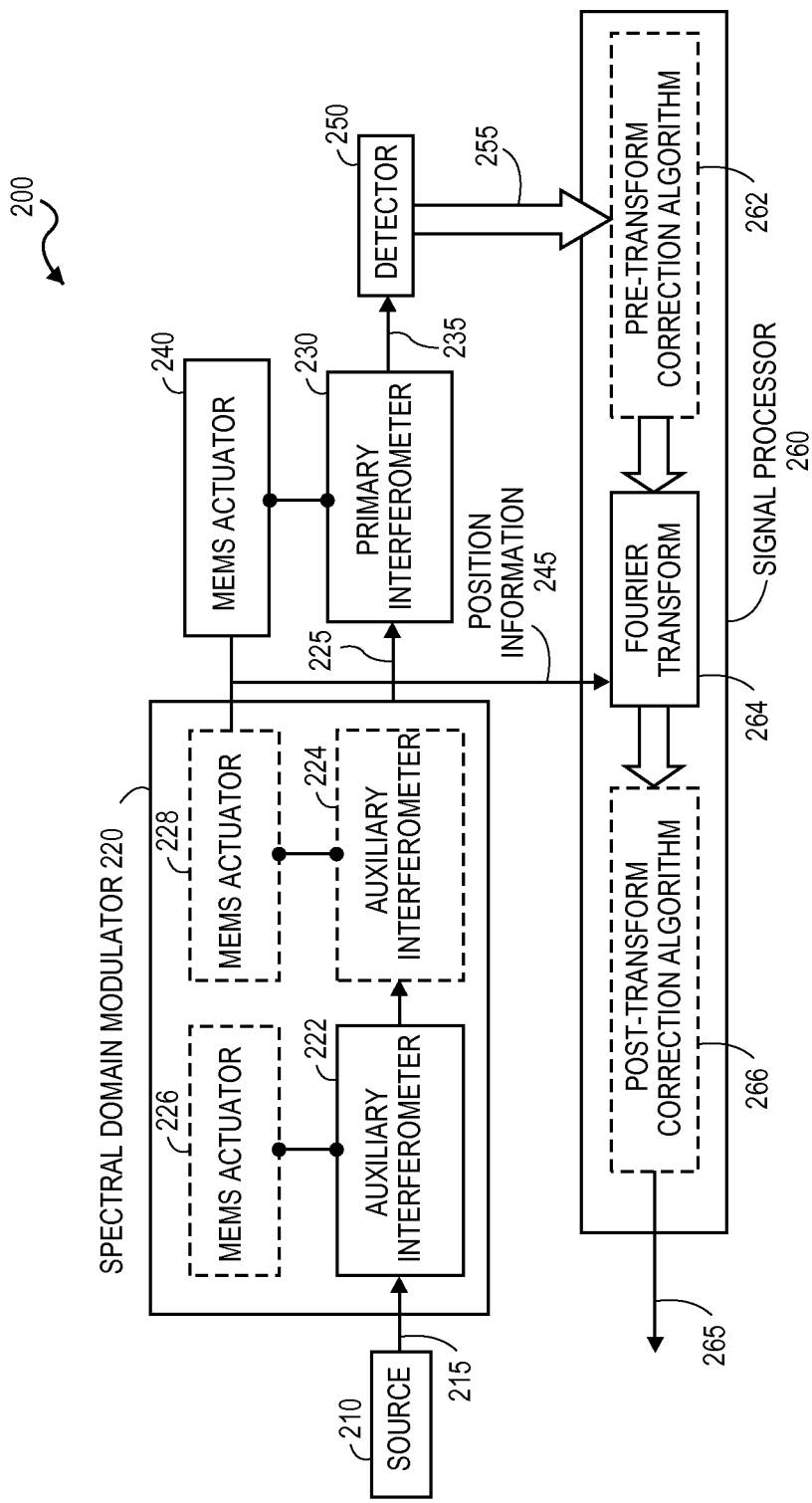
FIG. 2 is a block diagram illustrating further exemplary components of a spectrometer, in accordance with embodiments of the present invention.

FIG. 2 is a block diagram illustrating further exemplary components of a spectrometer 200, in accordance with embodiments of the present invention. The spectrometer 200 includes an optical source 210, the spectral domain modulator 220, the primary modulator 230 coupled to the MEMS actuator 240, the optical detector 250 and the signal processor 260. The optical source 210 may be, for example, a laser source, a collimated LED, an optical fiber, or any other type of optical source that produces Infra Red (IR) radiation. A sample under test (not shown) can be inserted anywhere in between the source 210 and the detector 250.

In addition, as shown in FIG. 2, the spectral domain modulator 220 includes one or more auxiliary interferometers 222 and 224. The interference path of one or more of the auxiliary interferometers 222 and 224 may further be varied mechanically using optional MEMS actuators 226 and 228. Information 245 about the position of all of the MEMS actuators 226, 228 and 240 are fed to the signal processor 260.

In one embodiment, the primary and auxiliary interferometers 222, 224 and 230 are the same type of interferometers and made from the same material. In other embodiments, the primary and auxiliary interferometers 222, 224 and 230 are different types and/or made from different materials. For example, one or more of the primary and auxiliary interferometers 222, 224 and 230 may be of Michelson, Mach-Zehnder (MZ) or Fabry-Perot (FP) types, or a combination thereof. As another example, each of the interferometers 222, 224 and 230 may be made from air or silicon or both. Using interferometers 222, 224 and 230 attached to MEMS actuators 226, 228 and 240 enables the production of a micro spectrometer 200 with high resolution performance, compact size and low cost. Monolithic integration and lithographic alignment of the components within the micro spectrometer 200 can also be achieved using, for example, a deep etching technique or a surface micromachining technique.

In an exemplary operation, the optical source 210 produces a wideband source spectrum 215 to the spectral domain modulator 220, which modulates the wideband source spectrum 215 to produce a modulated wideband source spectrum 225. The primary interferometer 230 is optically coupled to receive the modulated wideband source spectrum 225 and operable to direct the modulated wideband source spectrum 225 along an optical path so as to produce an interference pattern 235 at an output of the primary interferometer 230. The primary interferometer 230 further includes at least one moveable element (such as a mirror) coupled to the MEMS actuator 240, which causes a displacement of the at least one moveable element to vary the optical path. The optical detector 250 is optically coupled to detect an interferogram 255 produced as a result of the interference pattern 235 and the displacement of the at least one moveable element in the primary interferometer 230.

The use of one or multiple auxiliary interferometers 222 and 224 causes a shift in the interferogram burst produced by the primary interferometer 230. This shift enables the limited travel range of the MEMS actuators 226, 228 and 240 to be overcome, while extending the resolution of the spectrometer 200. In addition, the shift enables the capture of a double-sided interferogram (i.e. extending from −ve to +ve OPD including interferogram central burst). The detection of a double-sided interferogram also enables compensation of the material-dispersion effect.

The signal processor 260 includes a Fourier transform module 264 that applies a Fourier transform to the interferogram 255 to retrieve the measured spectrum 265. In some embodiments, the signal processor 260 further applies a correction algorithm either before or after the Fourier transform to correct for interferometry non-idealities, resulting from, for example, multiple-beam interferometry. For example, the signal processor 260 may include one of a pre-transform correction algorithm module 262 or a post-transform correction algorithm module 266. In combination with the Fourier transform module 264, the pre-transform correction algorithm module 262 or the post-transform correction algorithm module 266 implements a two-phase calibration scheme. The first phase, performed by the Fourier transform module 264, calibrates the MEMS actuator motion based on the position information 245 of the MEMS actuators 226, 228 and 240 to produce the correct wavelength after the Fourier transform. The second phase, performed by the pre-transform or post-transform correction algorithm module 262 or 266, calibrates the non-idealities correction parameters, which are dependent on the fabrication process tolerance. As a result of the second phase, any harmonics generated in the output spectrum 265 due to non-ideal (not pure cosine function) interferometer responses are minimized or nulled.

As described above, the auxiliary interferometer(s) 222 and 224 carry out modulation of the wideband source spectrum 215 by a periodic function. This function is composed of a periodic AC term superimposed on a constant (DC) term. From Fourier transform theory, a modulation in the frequency domain leads to a shift in the time or spatial domain. Since the modulating function has a DC term, the resulting Fourier transform in the spatial domain contains the original as well as the shifted form. An example of this is illustrated in FIGS. 3A and 3B.

Figure 3A:
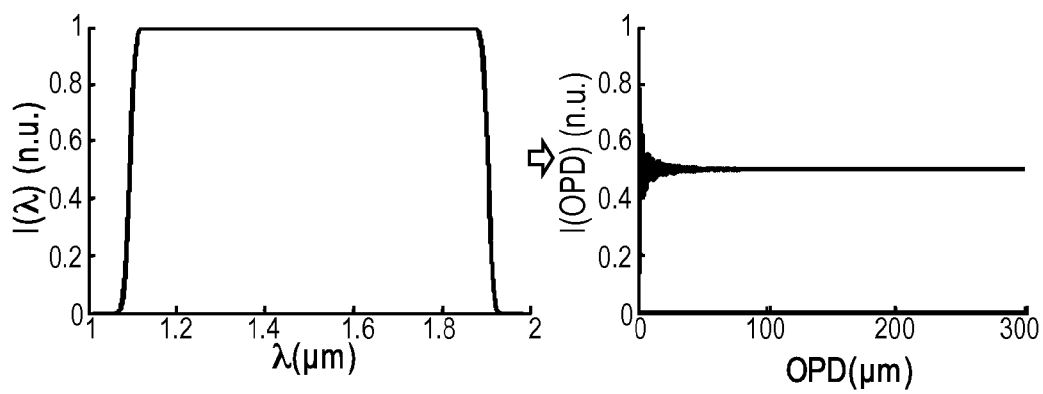
FIGS. 3A and 3B illustrate exemplary broadband source spectrums and corresponding interferograms with and without modulation.
Figure 3B:
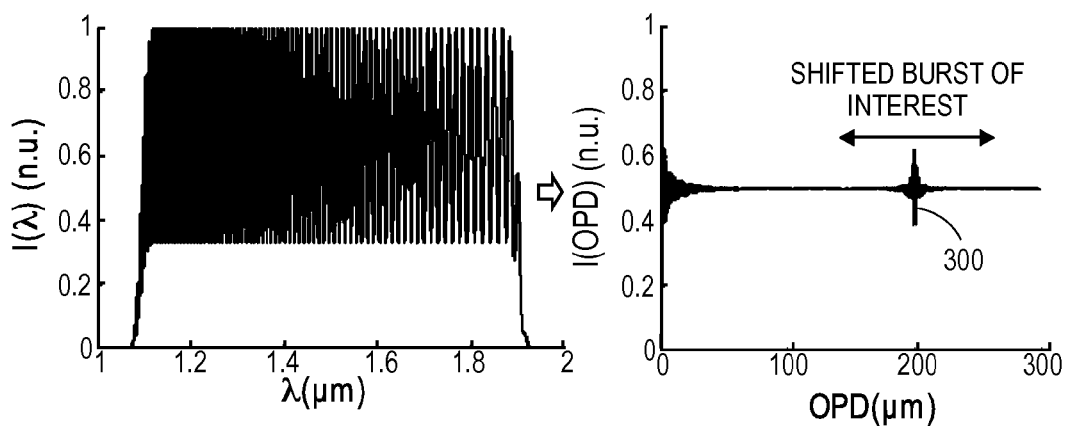

FIGS. 3A and 3B illustrate exemplary broadband source spectrums and corresponding interferograms, with and without modulation. For example, an original wideband source spectrum and the corresponding interferogram are shown in FIG. 3A, while a modulated source spectrum and the corresponding interferogram are shown in FIG. 3B. Mathematically, let the original wideband source spectrum be denoted by B(v) and the corresponding Fourier transform (or interferogram) be denoted by I(x). The multiplication of B(v) by the cosine function $a+b\cos(2\pi x_o v)$ results in an interferogram in the form of:

$$aI(x)+bI(x-x_o), \quad (1)$$

where x refers to the position of the auxiliary interferometer actuator.

In embodiments in which the auxiliary interferometer contains two actuators that vary its optical path, the multiplication of B(v) by two cosine functions $[a_1+b_1 \cos(2\pi x_1 v)]$ $[a_2+b_2 \cos(2\pi x_2 v)]$ results in an interferogram in the form of:

$$a_1 a_2 I(x) + b_1 I(x-x_1) + b_2 I(x-x_2) + 0.5 b_1 b_2 I(x-x_2-x_1) + 0.5 b_1 b_2 I(x-x_2+x_1) \quad (2)$$

If $x_2 = x_1$, then the interferogram is in the form of:

$$[a_1 a_2 + 0.5 b_1 b_2] I(x) + [b_1 + b_2] I(x-x_1) + 0.5 b_1 b_2 I(x-2x_1) \quad (3)$$

By using spectral domain modulation, the constraint on the primary interferometer to capture the zero OPD interferogram is removed. For example, as can be seen in FIG. 3B, modulation of the original source spectrum results in a shifted burst of interest 300, corresponding to the information normally obtained at the zero OPD. This allows the use of various types of interferometers, including Michelson, Mach-Zehnder and FP interferometers, as primary interferometers and simplifies and makes more compact the geometrical design of the interferometer by relaxing the constraints of the OPD.

In an exemplary embodiment, the exact locations and periodicity of the modulation peaks in the spectral domain may not be needed to retrieve the original spectrum. By applying a complex Fourier transform and taking the magnitude, the same measured spectrum is retrieved regardless of the amount of shift introduced in the interferogram. This would not be the case if the real part (i.e., the cosine transform) is taken, in which the resulting retrieved spectrum is modulated and a division by the modulation function is needed to retrieve the original spectrum.

Figures 4A, 4B:
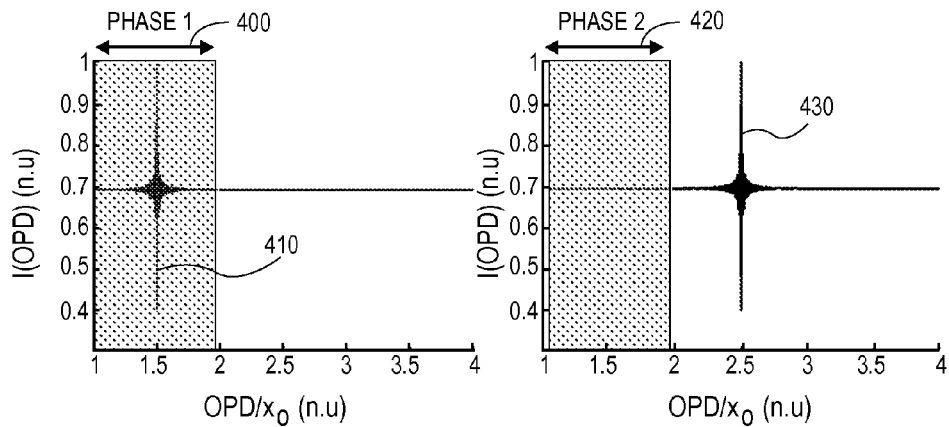
FIGS. 4A and 4B illustrate exemplary interferograms at different positions of an auxiliary interferogram.

In addition to enabling retrieval of the zero OPD information without requiring the capture of the zero OPD interferogram, spectral domain modulation enables extension of the spectrometer resolution beyond the travel range limits of the MEMS actuators. For example, as can be seen in FIGS. 4A and 4B, if the auxiliary interferometer is attached to another MEMS actuator, the optical path of the auxiliary interferometer can be assigned two values due to actuation: $1.5x_o$ in phase one and $2.5x_o$ in phase two, where the actuator travel range is $0.5x_o$ (OP=2*mechanical displacement). Assuming the primary interferometer actual travel range is from $1x_o$ to $2x_o$, then in phase one 400, the interferogram can be recorded from a OPD of $-0.5x_o$ to $0.5x_o$ relative to the burst center 410. In phase two 420, the interferogram can be recorded from a OPD of $-1.5x_o$ to $-0.5x_o$ relative to the burst center 430. In this way, the interferogram can be covered from $-1.5x_o$ to $0.5x_o$ (i.e., double the covered distance) when the auxiliary interferometer optical distance is fixed at a given value (i.e., $1.5x_o$ or $2.5x_o$). As mentioned above, information about the auxiliary interferometer optical distance in addition to that of the primary interferometer is needed in the signal processor to the calculate the measured spectrum.

Figures 5A, 5B:
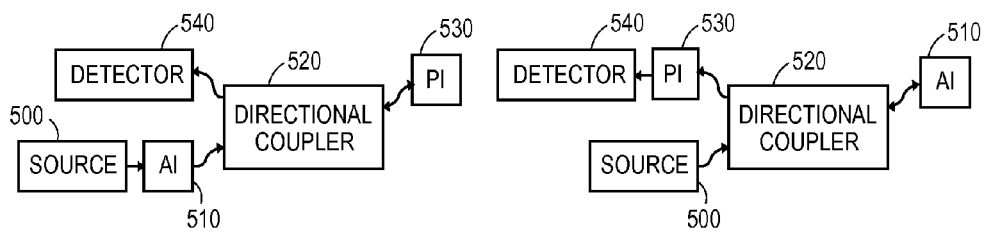
FIGS. 5A-5D are block diagrams illustrating exemplary arrangements of primary and auxiliary interferometers of the spectrometer, in accordance with embodiments of the present invention.

FIGS. 5A-5D are block diagrams illustrating exemplary arrangements of primary and auxiliary interferometers of the spectrometer, in accordance with embodiments of the present invention. As can be seen in FIGS. 5A-5D, the primary and auxiliary interferometers may be used in either a transmission mode or a reflection mode. For example, as shown in FIG. 5A, the auxiliary interferometer 510 is configured in a transmission mode with respect to the optical source 500 and the optical detector 540, while the primary interferometer 530 is configured in a reflection mode. A directional coupler 520 directs the output of the auxiliary interferometer 520 to the primary interferometer 530. The primary interferometer 530 then reflects the output thereof back towards the directional coupler 520, which then directs the primary interferometer output (interferogram) to the optical detector 540.

Figures 5C, 5D:
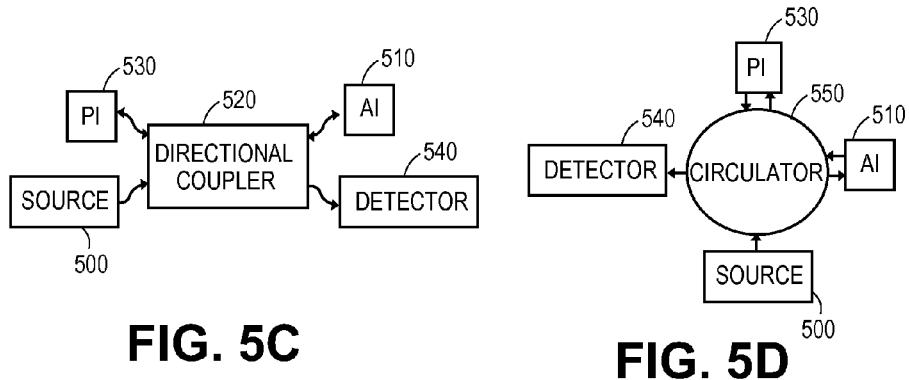

In FIG. 5B, the auxiliary interferometer 510 is configured in a reflection mode to reflect the output thereof back towards the directional coupler 520, while the primary interferometer 530 is configured in a transmission mode with respect to the optical detector 540. In FIG. 5C, both the auxiliary interferometer 510 and the primary interferometer 530 are configured in a reflection mode to reflect their respective output back towards the directional coupler 520. In FIG. 5D, a circulator 550 is used to facilitate a reflection mode for both the auxiliary interferometer 510 and the primary interferometer 530. In an exemplary embodiment, the use of a circulator 550 avoids signal losses due to the directional coupler division. It should be noted that any wavelength dependence of the coupler, circulator or detector can be accounted for by the signal processor.

It should be understood that the auxiliary and primary interferometers 510 and 530 can be of any type, such as Michelson, Fabry-Perot (FP) or Mach-Zehnder (MZ). In addition, it should be further understood that the auxiliary and primary interferometers 510 and 530 can be coupled or uncoupled.

FIGS. 6A-6C illustrate exemplary spectrometers 600 combining Michelson and Fabry-Perot interferometers 610 and 620, respectively, in accordance with embodiments of the present invention. In each of FIGS. 6A-6C, either of the interferometers 610 and 620 may operate as the spectral domain modulator (auxiliary interferometer), with the other interferometer operating as the primary interferometer.

In FIG. 6A, the FP interferometer 620 is placed after the Michelson interferometer 610. However, in other embodiments, the FP interferometer may be placed at the input of the Michelson interferometer. A simplified configuration of the Michelson interferometer 610 is shown in FIG. 6A. The Michelson interferometer 610 includes a beam splitter 612, fixed mirror 614 and a moveable mirror 616 (which is coupled to an actuator, not shown). Collimated light from a broadband source is split into two beams by the beam splitter 612. One beam is reflected off the fixed mirror 614, while the other beam is reflected off the moveable mirror 616. The reflected beams are recombined at the beam splitter 612, and the resulting interference pattern is provided as input to the FP interferometer 620.

Although not shown, the FP interferometer 620 may include, for example, two parallel and opposing reflective surfaces forming a FP cavity therebetween. The output of the Michelson interferometer 610 enters the FP cavity and is reflected multiple times off of each of the reflecting surfaces. Part of the reflected light is transmitted through one of the reflective surfaces each time the light reaches that surface, resulting in multiple offset beams that interfere with each other to produce a second interference pattern (modulated interference pattern) that can be detected by the detector 630.

FIGS. 6B and 6C illustrate an implementation of spectrometer 600 using a silicon half-plane (silicon-air interface) beam splitter 612 and metallized mirrors 614 and 616 in the Michelson interferometer. The half-plane beam splitter 612 is formed on a surface of a silicon block 640, with the fixed mirror 614 being formed on an opposing surface of the silicon block 640 such that one of the beams travels through the silicon wedge 640 to the fixed mirror 614. In FIG. 6B, silicon mirrors 622 and 624 are used for the FP interferometer 620, where one of the silicon mirrors 624 is another surface of the silicon block 640 through which the output of the Michelson interferometer travels. Although not shown, MEMS actuators may be used to displace the moving Michelson mirror 616 and one of the FP silicon mirrors 622.

In FIG. 6C, the FP interferometer 620 is placed before the Michelson interferometer such that the output of the Michelson interferometer travels through the silicon block to the detector 630. The configurations shown in FIGS. 6A-6C simplify the design of the interferometers by overcoming the need to have the zero OPD point included in the scanning regime. However, it should be understood that other configurations of the Michelson and FP interferometers 610 and 620 are possible, and the disclosure is not limited to any particular configuration.

Figure 7B:
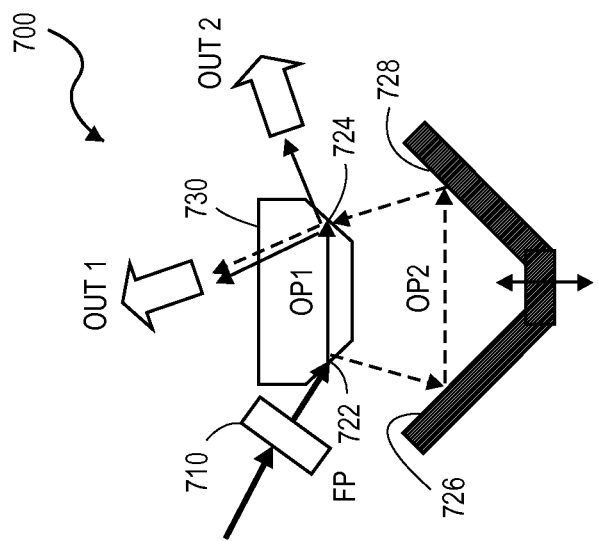
FIGS. 7A and 7B illustrate exemplary spectrometers combining Mach-Zehnder and Fabry-Perot interferometers, in accordance with embodiments of the present invention.
Figure 7A:
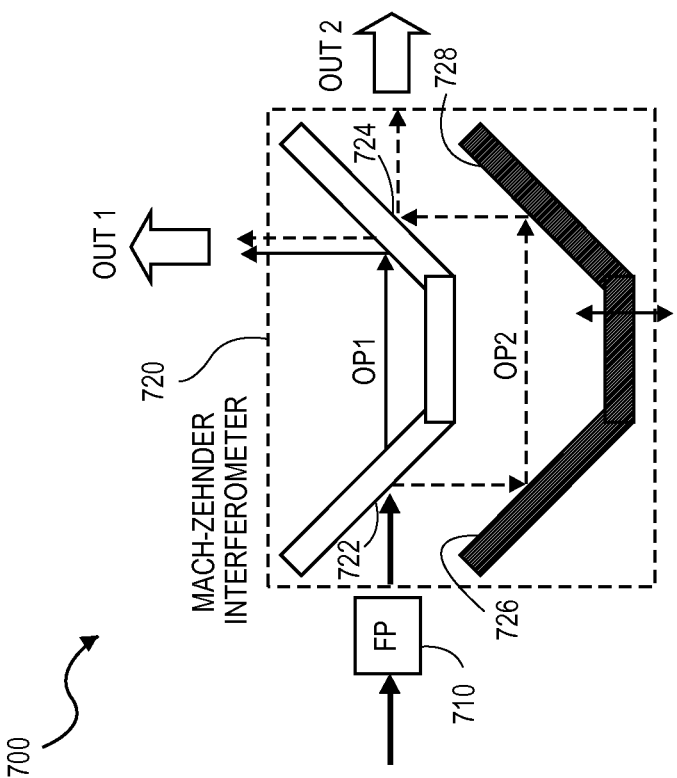

FIGS. 7A and 7B illustrate exemplary spectrometers 700 combining Fabry-Perot and Mach-Zehnder interferometers 710 and 720, respectively, in accordance with embodiments of the present invention. In each of FIGS. 7A and 7B, the FP interferometer 710 is positioned at the input to the Mach-Zehnder interferometer 720. However, in other embodiments, the FP interferometer 710 may be positioned at one of the outputs of the Mach-Zehnder interferometer 720.

In FIG. 7A, the Mach-Zehnder (MZ) interferometer 720 includes first and second coupled beam splitters 722 and 724 and first and second coupled moveable mirrors 726 and 728. The output of the FP interferometer 710 is input to the first beam splitter 722 of the MZ interferometer 722, where it is split into two beams. One of the beams travels along a first optical path (OP1) towards the second beam splitter 724, while the other beam travels along a second optical path (OP2), where it is reflected off moveable mirrors 726 and 728 towards the second beam splitter 728. In the MZ interferometer configuration of FIG. 7A, zero OPD between the two optical paths OP1 and OP2 is not possible to achieve since both beams travel through air because OP2>OP1. However, by loading the MZ interferometer 720 with a spectral domain modulator, such as the FP interferometer 710, zero OPD is not needed to retrieve the measured spectrum (due to the shifted burst).

In FIG. 7B, the first and second beam splitters 722 and 724 of the MZ interferometer are silicon half-plane beam splitters formed on respective opposing surfaces of a silicon block 730. Since the OP1 optical beam travels through the silicon block 740, while the OP2 optical beam travels through air, zero OPD can be achieved. However, such a configuration puts restrictions on the size of the spectrometer 700. This restriction can be overcome by loading the MZ interferometer with a spectral domain modulator, such as the FP interferometer 710, in the input and or output(s) of the Mach-Zehnder interferometer 720.

Figure 8B:
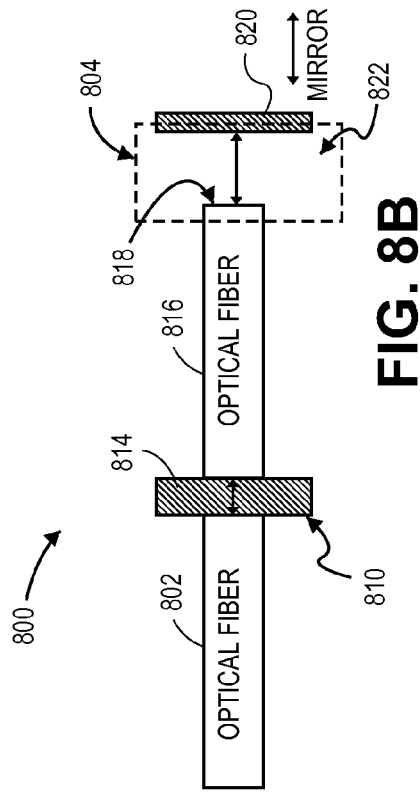
Figure 8D:
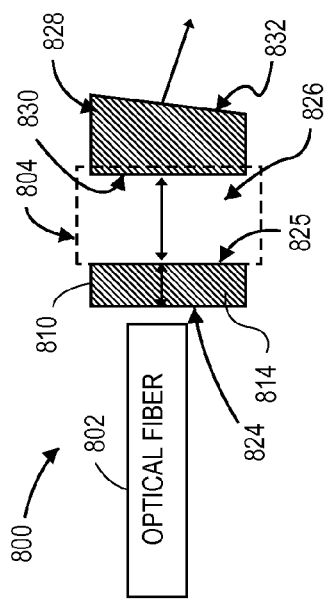
Figure 8A:
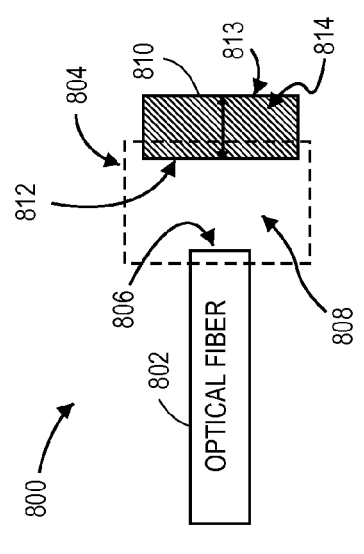

Referring now to FIGS. 8A-8G, optical fibers can be used in conjunction with air as well as dielectric (e.g., silicon) cavities to integrate primary/auxiliary FP interferometers and MEMS actuators of a spectrometer 800 within a chip. In FIG. 8A, a dielectric material 814 with parallel partially reflective surfaces 812 and 813 is used to form the auxiliary FP interferometer 810. The primary FP interferometer 804 includes an air cavity 808 between a fiber-air interface on an end 806 of an optical fiber 802 and dielectric surface 812 of the dielectric material 814. In one embodiment, the fiber end 806 can be coated with a dielectric or thin metallic material to improve its reflectivity to a given value. In another embodiment, an uncoated fiber end 806 is used to produce a low finesse FP interferometer.

In FIG. 8B, the dielectric material 814 forming the auxiliary FP interferometer 810 is placed after the optical fiber 802 and an additional optical fiber 816 is inserted in the optical path between the auxiliary FP interferometer and the primary FP interferometer 804. The primary FP interferometer 804 includes an air cavity 822 between a fiber-air interface on an end 818 of the additional optical fiber 816 and a moveable dielectric mirror 820. The dielectric mirror 820 may be partially or fully reflective. In another embodiment, the additional fiber 816 may be removed (i.e., replaced by free space).

Figure 8C:
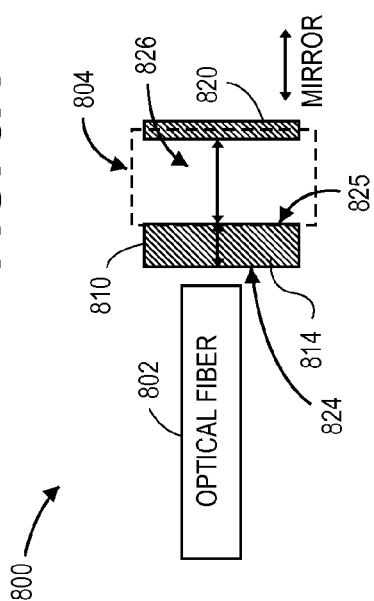

In FIG. 8C, first and second parallel surfaces 824 and 825 of the dielectric material 814 are used as the mirrors of the auxiliary FP interferometer 810 with the first surface 824 being optically coupled to the optical fiber 802. The second surface 825 of the dielectric material 825, together with the dielectric mirror 820 are used as the mirrors of the primary FP interferometer 804. In addition to attaching the dielectric mirror 820 to a MEMS actuator, the dielectric material 814 can be also attached to a MEMS actuator to further modulate an air cavity 826 of the primary FP interferometer 804. In one embodiment of FIGS. 8B and 8C, the end dielectric mirror 820 may be made of dielectric material and non-metallized. In this embodiment, if the surfaces of the mirror 820 are parallel, the mirror 820 may act as a second auxiliary FP interferometer.

The spectrometer configuration shown in FIG. 8D is similar to that shown in FIG. 8C, with the exception of an additional piece of dielectric material 828 having first and second surfaces 830 and 832 being included in the spectrometer 800. One surface 830 of the additional dielectric material 828 serves as the dielectric mirror of the primary FP interferometer 804. However, the first and second surfaces 830 and 832 are not parallel to suppress a third interferometer (i.e., an additional auxiliary or additional primary FP interferometer).

In FIG. 8E, another piece dielectric material 834 having one or both of its surfaces 836 and 838 curved to perform light collimation in addition to serving as the auxiliary FP interferometer 810. The primary FP interferometer 804 includes an air cavity 840 between one of the curved surfaces 836 of the dielectric material 834 and the dielectric mirror 820.

In FIG. 8F, the auxiliary FP interferometer 810 is formed between parallel surfaces 842 and 843 of the dielectric material 814 and the primary FP interferometer 804 includes an air cavity 846 formed between one of the parallel surfaces 842 of the dielectric material 814 and an end mirror 844. The end mirror 844 has one or both of its ends curved to efficiently trap the light inside the air cavity 846 free of diffraction losses or to focus the light on the detector. The mirror 844 can be curved in 2D or 3D manner.

In FIG. 8G, both the auxiliary FP interferometer 810 and the primary FP interferometer 804 are formed from a non-dispersive medium. The auxiliary FP interferometer 810 includes an air cavity 848 formed between a fiber-air interface of an end 806 of an optical fiber 802 and a dielectric mirror surface 852 of a dielectric material 850, such that the light travels in a dielectric medium with minimized diffraction. The primary FP interferometer 804 includes an air cavity 856 formed between surfaces 854 and 860 of respective pieces of dielectric materials 850 and 858.

In other embodiments, as shown in FIGS. 9A-9D, the primary and auxiliary FP interferometers of the spectrometer 900 can both be formed of dielectric pieces. For example, as shown in FIG. 9A, the auxiliary FP interferometer 906 can be formed between two parallel surfaces of respective dielectric pieces 902 and 904, while the primary FP interferometer 912 can be formed between two parallel surfaces of additional dielectric pieces 908 and 910. In addition, as can be seen in FIG. 9A, the opposing surfaces 914 and 916 of one or more dielectric pieces (e.g., dielectric piece 910) can be tilted with the respect to the other to prevent parasitic FPs.

In another embodiment, as shown in FIG. 9B, anti-reflective coating 918, 920, 922 and 924 can be added to the external surfaces of the dielectric pieces 902, 904, 908 and 910 to prevent reflection from these surfaces. In yet another embodiment, as shown in FIG. 9C, one of the dielectric surfaces (e.g., surface 926) of one or more of the dielectric pieces 902 can be curved, and the dielectric thickness (t) can be controlled such that the dielectric piece is an unstable cavity. In still another embodiment, as shown in FIG. 9D, the auxiliary FP interferometer 906 can include more than one auxiliary FP interferometer 930 and 932. As can be seen in FIG. 9D, the auxiliary/primary FP interferometer space is air, while the mirrors are formed at air-dielectric interfaces of dielectric pieces 934, 936, 938, 940 and 942. At least one of the auxiliary dielectric mirrors may be movable and attached to an actuator. In other embodiments, multiple dielectric mirrors are attached to the same actuator or different actuators to extend the resolution.

As shown in FIGS. 10A-10C, the resolution of the spectrometer 1000 can further be improved if more than one auxiliary interferometer 1010 and 1020 is added in the spectral domain modulator or if more than two discrete optical distances can be set. For example, as shown in FIG. 10A, initially, none of the auxiliary interferometers 1010 and 1020 are in the optical path. The interferogram is then recorded by only the primary interferometer 1090. As shown in FIG. 10B, a MEMS actuator 1015 can be used to insert one of the auxiliary interferometers 1010 in the optical path, for example by shifting a dielectric material (i.e., silicon) with parallel faces in the optical path. As shown in FIG. 10C, another MEMS actuator 1030 can be used to insert the other auxiliary interferometer 1020 in the optical path. Thus, more than one auxiliary interferometer 1010 and 1020 can be inserted into the optical path at a time.

Referring now to FIGS. 11A-11D, in another embodiment, only one auxiliary interferometer at a time is inserted into the optical path 1105 of the spectrometer 1100 to avoid mixed burst shifts in the spatial domain. In the embodiment shown in FIGS. 11A-11D, the auxiliary interferometers 1110, 1115 and 1120 are arranged and attached to a single MEMS actuator 1125. In FIG. 11A, none of the auxiliary interferometers 1110, 1115 and 1120 are inserted into the optical path 1105, and therefore, there is not a shift in the interferogram recorded by the primary interferometer 1130. In FIG. 11B, the interferogram is shifted according to the optical path of auxiliary interferometer 1110. Likewise, in FIG. 11C, the interferogram is shirted according to the optical path of auxiliary interferometer 1115, and in FIG. 11D, the interferogram is shifted according to the optical path of auxiliary interferometer 1120.

Figure 12A:
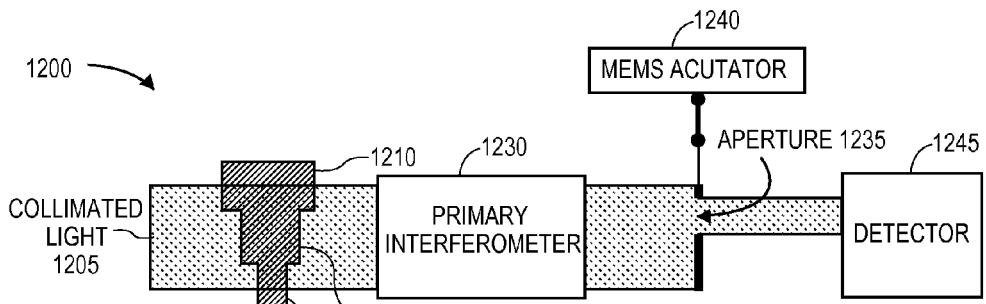
FIGS. 12A-12E illustrate another exemplary spectrometer including multiple auxiliary interferometers, in accordance with embodiments of the present invention.
Figure 12B:
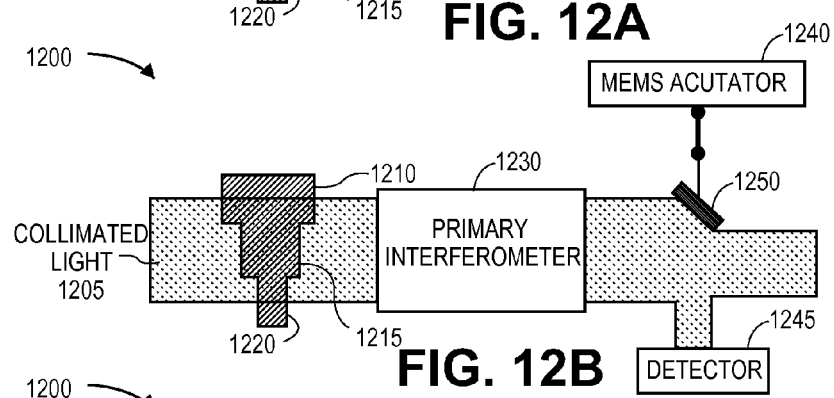
Figure 12C:
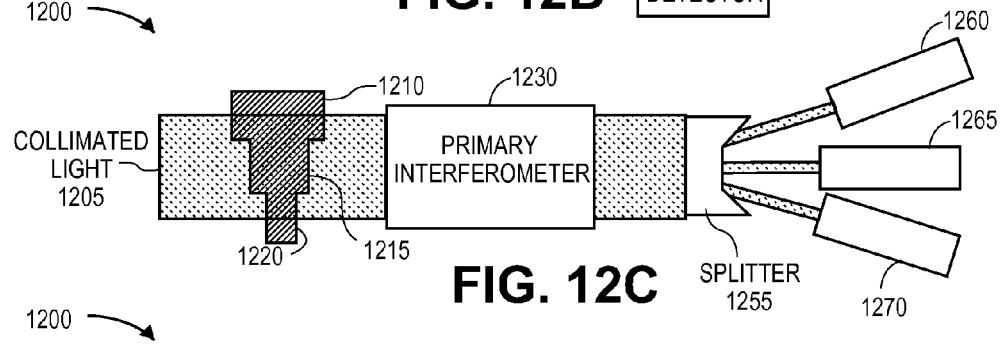
Figure 12D:
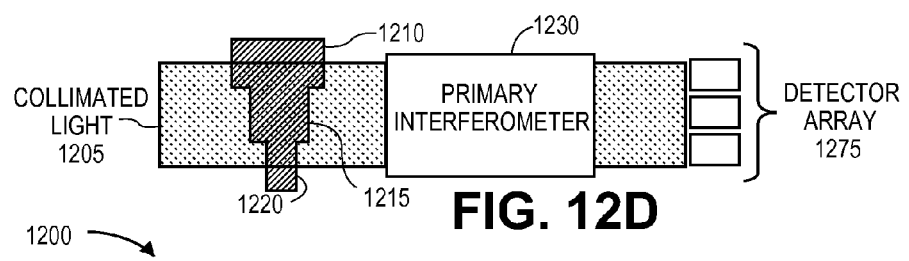
Figure 12E:
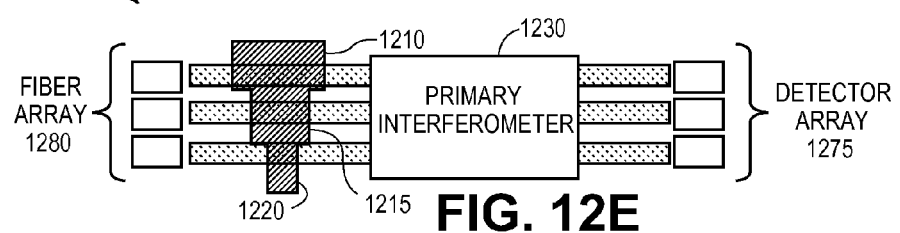

Referring now to FIGS. 12A-12E, in other embodiments, the auxiliary interferometers 1210, 1215 and 1220 of the spectrometer 1200 can all be within the optical path in parallel, such that each auxiliary interferometer 1210, 1215 and 1220 operates on a different spatial part of the input collimated light 1205. In one exemplary embodiment, as shown in FIGS. 12A and 12B, different contributions from each of the auxiliary interferometers 1210, 1215 and 1220 can be selected for input to a detector 1245 using an aperture 1235 or mirror 1250 attached to a MEMS actuator 1240. In another exemplary embodiment, as shown in FIG. 12C, the different contributions from each of the auxiliary interferometers 1210, 1215 and 1220 can be split by a splitter 1255 and projected onto different corresponding detectors 1260, 1265 and 1270. In yet another exemplary embodiment, as shown in FIG. 12D, a detector array 1275 may be used instead of a splitter to measure the different contributions from each of the auxiliary interferometers. The contributions from the auxiliary interferometers 1210, 1215 and 1220 may be split after the primary interferometer 1230, as shown in FIGS. 12C and 12D, or before the auxiliary interferometers 1210, 1215 and 1220 by using a fiber array 1280, as shown in FIG. 12E.

Figure 13A:
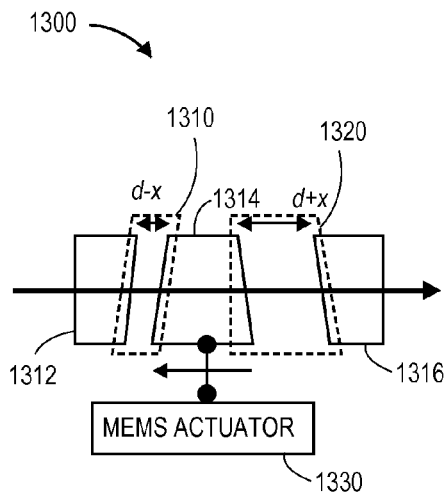
FIGS. 13A and 13B illustrate an exemplary spectrometer with increased resolution, in accordance with embodiments of the present invention.
Figure 13B:
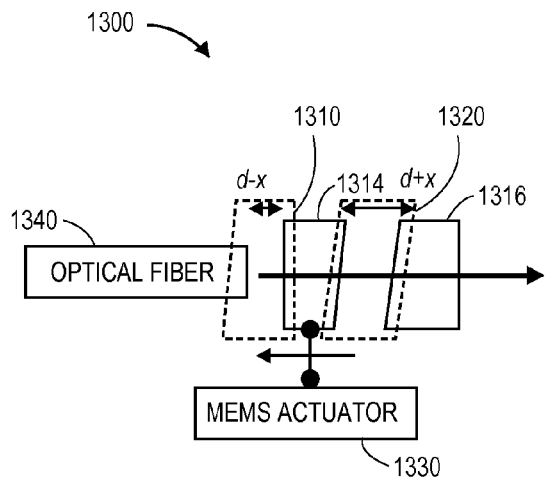

FIGS. 13A and 13B illustrate another exemplary spectrometer 1300 that provides for increased resolution by dynamically linking the optical path of the modulating (auxiliary) interferometer(s) 1310 to the optical path of the primary interferometer 1320. For example, by changing both the auxiliary and the primary interferometer optical path simultaneously and oppositely using the same MEMS actuator 1330, the resolution of the spectrometer 1300 can be doubled. As shown in FIG. 13A, the auxiliary and primary FP interferometers 1310 and 1320 are each formed of dielectric-air interface mirrors on the surfaces of dielectric pieces 1312, 1314 and 1316. The dielectric surfaces on dielectric pieces 1312 and 1314 forming the auxiliary interferometer 1310 are parallel and the dielectric surfaces on dielectric pieces 1314 and 1316 forming the primary interferometer 1320 are parallel.

The middle dielectric piece 1314 is attached to the MEMS actuator 1330, and may be displaced such that the air cavity width of both FP interferometers 1310 and 1320 changes oppositely. For example, as the MEMS actuator 1330 moves dielectric piece 1314 in a first direction (shown by the arrow) a distance x, the air cavity width of the auxiliary interferometer 1310 changes as d−x, while the air cavity width of the primary interferometer 1320 changes as d+x. It should be noted that although interferometer 1320 is indicated as being the primary interferometer, since both interferometers 1310 and 1320 are scanning interferometers, either of the interferometers 1310 and 1320 may be considered to be the primary, while the other is considered the auxiliary.

In another embodiment, as shown in FIG. 13B, a fiber-air interface of an optical fiber 1340 can be used as one of the dielectric mirrors of the auxiliary interferometer 1310. In this embodiment, the optical fiber end may be, for example, multi-layer coated or thin film metallized. Thus, as can be seen in FIG. 13B, the auxiliary FP interferometer 1310 is formed from the optical fiber 1340 and an opposing dielectric interface on dielectric piece 1314, while the primary FP interferometer is formed from the opposing dielectric interfaces on dielectric pieces 1314 and 1316.

Figure 14:
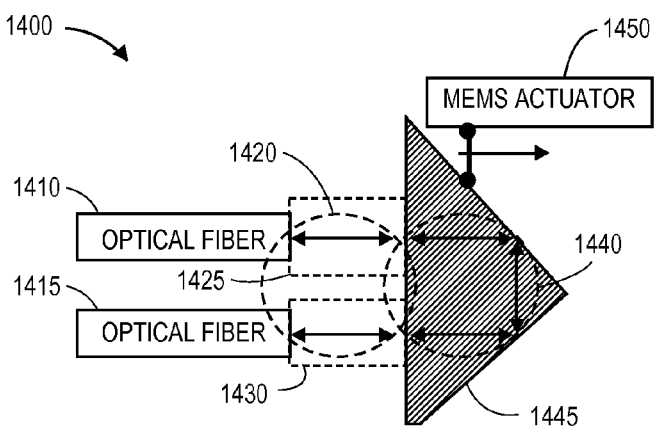
FIG. 14 illustrates another exemplary spectrometer with increased resolution, in accordance with embodiments of the present invention.

FIG. 14 illustrates another exemplary embodiment of a spectrometer 1400 achieving increased resolution by including two identical interferometers 1425 and 1430 that collectively function as the primary interferometer 1420 and scanning both of the primary interferometers 1425 and 1430 substantially simultaneously. In the embodiment shown in FIG. 14, each of the primary FP interferometers 1425 and 1430 is formed of a respective fiber-air interface of a respective optical fiber 1410 and 1415 and a dielectric-air interface of a same surface of a dielectric material 1445. The auxiliary FP interferometer 1440 is formed within the dielectric material 1445. The dielectric material 1445 can further be coupled to a MEMS actuator 1450 to simultaneously widen or narrow the air cavity of each of the primary FP interferometers 1425 and 1430. Thus, as can be seen in FIG. 14, as a result of motion of the MEMS actuator 1450, the change in the optical path difference of the primary interferometer 1420 is doubled.

Figure 15A:
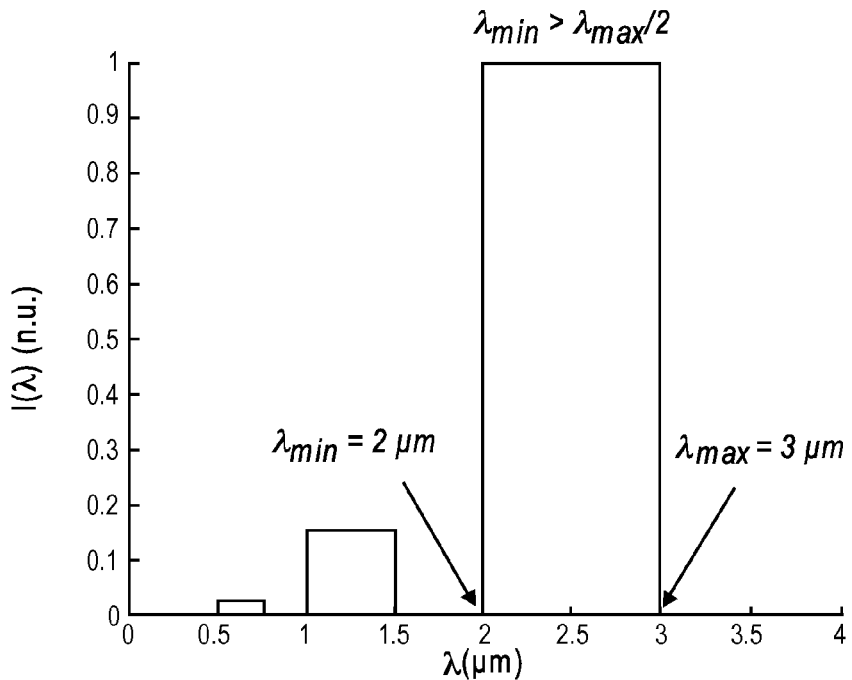
FIGS. 15A and 15B illustrate a spectrum and harmonics thereof with and without overlap therebetween.
Figure 15B:
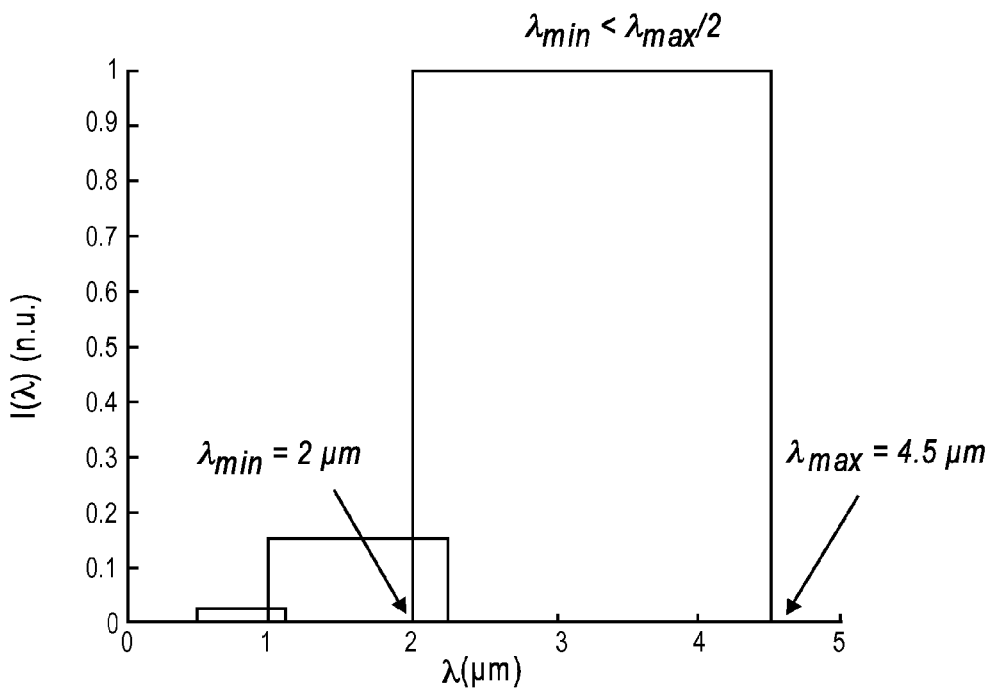

Referring now to FIGS. 15A and 15B, as is understood, the transfer function of a multiple beam interferometer (such as a FP interferometer) is not a pure cosine function, but rather has a transmission function in the form of:

$$T = \frac{1}{1 + 0.5\mathfrak{I}\left[1 - \cos\left(\frac{2\pi}{\lambda}2x\right)\right]} \quad (4)$$

where $\mathfrak{I}$ is the coefficient of finesse given by:

$$\mathfrak{I} = \frac{4\sqrt{R_1 R_2}}{\left(1 - \sqrt{R_1 R_2}\right)^2} \quad (5)$$

When a multiple beam interferometer is used as a primary interferometer, this difference leads to the appearance of harmonics in the retrieved spectrum that did not exist in the original spectrum. There are cases, however, in which the retrieved spectrum can be considered correct. For example, in an embodiment, when the finesse is low due to low mirror reflectivity or due to losses in propagation between the etalon mirrors, the retrieved/measured spectrum can be considered correct. In this case, the transmission function in (4) is reduced to:

$$T \cong 1 + 0.5\mathfrak{I}\cos\left(\frac{2\pi}{\lambda}2x\right) \quad (6)$$

An example of such a low finesse interferometer is shown in FIG. 8A, where the primary interferometer is formed of a fiber-air interface and a micro dielectric mirror.

In another embodiment, the retrieved spectrum can be considered correct when the system bandwidth is limited, such that the harmonics are out-of-band signals, regardless of the finesse of the primary FP interferometer. For example, if the broadband source bandwidth multiplied by the detector bandwidth is extended in wavelength from $\lambda_{min}$:$\lambda_{max}$, the harmonics of such a range will be in the smaller wavelength ranges of (½) ($\lambda_{min}$:$\lambda_{max}$), (⅓) ($\lambda_{min}$:$\lambda_{max}$), (¼) ($\lambda_{min}$:$\lambda_{max}$) and so on, as shown in FIGS. 15A and 15B. If the bandwidth is limited such that $\lambda_{min} > \lambda_{max}/2$, then the harmonics will be out-of-band, as shown in FIG. 15A. Otherwise, overlap may occur in the range of interest, as shown in FIG. 15B, and a correction is needed, if the harmonics are large enough. Thus, limiting the system bandwidth in the spectral domain may suppress the harmonics and avoid the needed for a correction algorithm.

Figure 16:
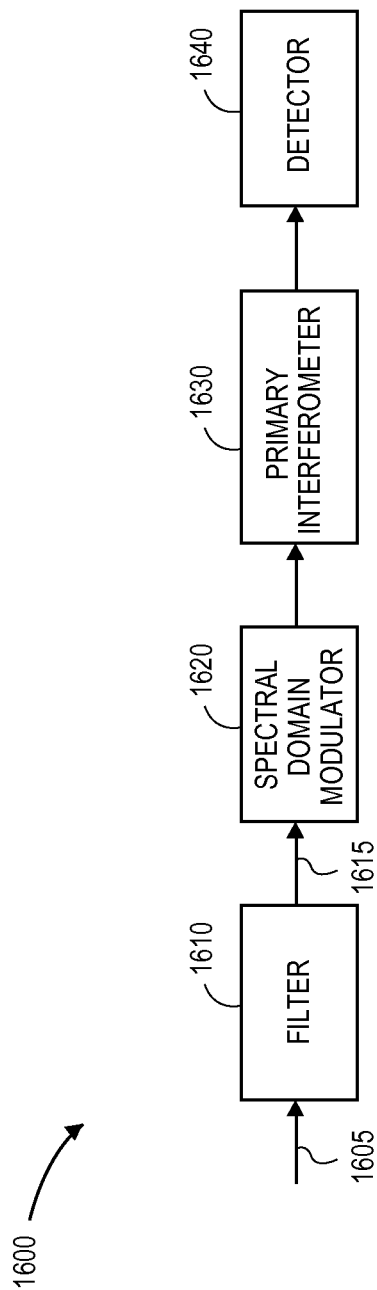
FIG. 16 is a block diagram illustrating exemplary components of a spectrometer that produces out-of-band harmonics, in accordance with embodiments of the present invention.

FIG. 16 is a block diagram illustrating exemplary components of a spectrometer 1600 that produces out-of-band harmonics, in accordance with embodiments of the present invention. The spectrometer 1600 includes a filter 1610, spectral domain modulator 1620, primary interferometer 1630 and optical detector 1640. The filter 1610 is optically coupled to receive an input wideband source spectrum 1605 and operates to filter the wideband source spectrum to produce a filtered spectrum 1615. In an exemplary embodiment, the filter 1610 operates to limit the bandwidth of the wideband source spectrum 1605 such that any harmonics will be out-of-band. For example, in one embodiment, the filter 1610 has a passband satisfying a condition that the minimum wavelength of the filtered spectrum 1615 is greater than half of the maximum wavelength of the filtered spectrum 1615. The filtered spectrum 1615 is input to the spectral domain modulator 1620 for modulation of the filtered spectrum 1615. The modulated filtered spectrum is then input to the primary interferometer 1630, and the resulting interferogram is detected by detector 1640. In an exemplary embodiment, the measured spectrum retrieved from the interferogram (after Fourier transform) is devoid of any harmonics due to the limitations on the system bandwidth provided by the filter 1610.

Figure 17:
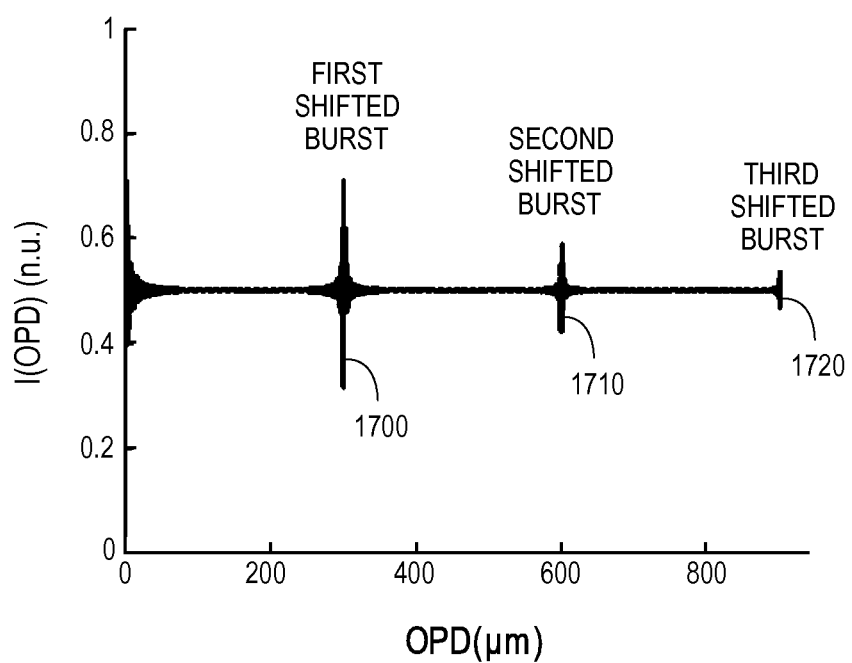
FIG. 17 illustrates multiple different shifted bursts in an interferogram.

Referring now to FIG. 17, if the coefficient of finesse is 5, the use of a multiple beam interferometer (i.e., FP interferometer) as an auxiliary interferometer may lead to the appearance of more than one shifted burst 1700, 1710 and 1720 in the interferogram. In an exemplary embodiment, as shown in FIG. 17, if the bursts 1700, 1710 and 1720 are widely separated or if the source spectrum is wide enough, there will be negligible interaction between the shifted bursts 1700, 1710 and 1720.

Figure 18A:
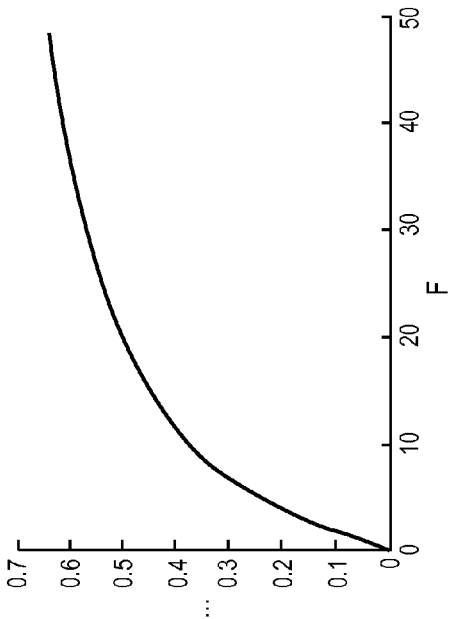
FIGS. 18A-18C illustrate the dependence of the fundamental tone and harmonics on the coefficient of finesse.
Figure 18B:
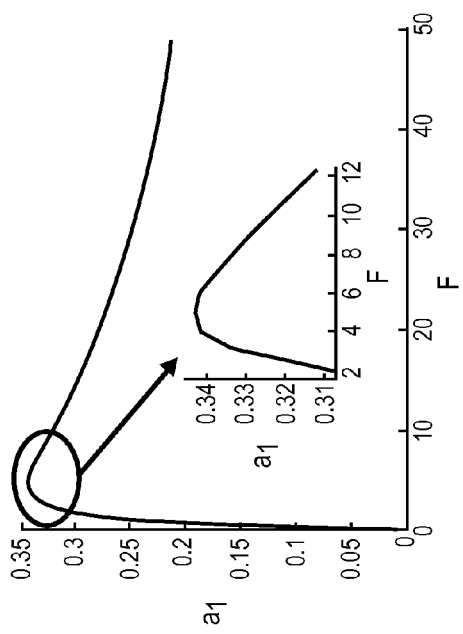

In addition, as mentioned above, when multiple-beam interferometers are used, the finesse of the interferometers can be optimized to maximize the power of the fundamental tone signal. This can increase the signal to noise ratio of the spectrometer significantly. Referring now to FIGS. 18A-18B, using equation (4), the coefficients of the fundamental tone as well as the sum of the harmonics are plotted versus the coefficient of finesses. As can be seen in FIG. 18B, the harmonics increase with increasing the coefficient of finesse monotonically, while the fundamental tone has maximized values in the range 0.31-0.3 for a coefficient of finesse in the range of 2 to 13, as can be seen in FIG. 18A.

Figure 18C:
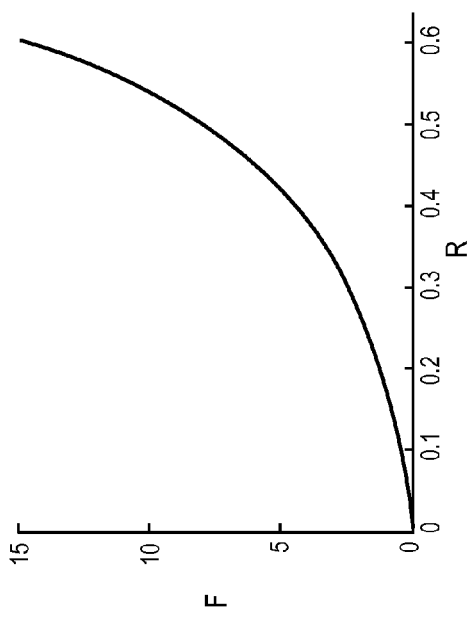

From FIGS. 18A-18B, it can be seen that too small of a finesse results in a poor fundamental signal, while a high finesse results in a large harmonic signal, both of which are undesirable. Therefore, the use of moderate coefficient of finesse value in the range of 2-4 maximizes the fundamental tone, while minimizing the harmonics. This range of finesse has a corresponding mirror reflectivity in the range of 0.25-0.4, as shown in FIG. 18C. In an exemplary embodiment, silicon-air interface mirrors (dielectric mirrors) may be used in the multiple beam auxiliary interferometer(s) to achieve such a reflectivity.

Figure 19A:
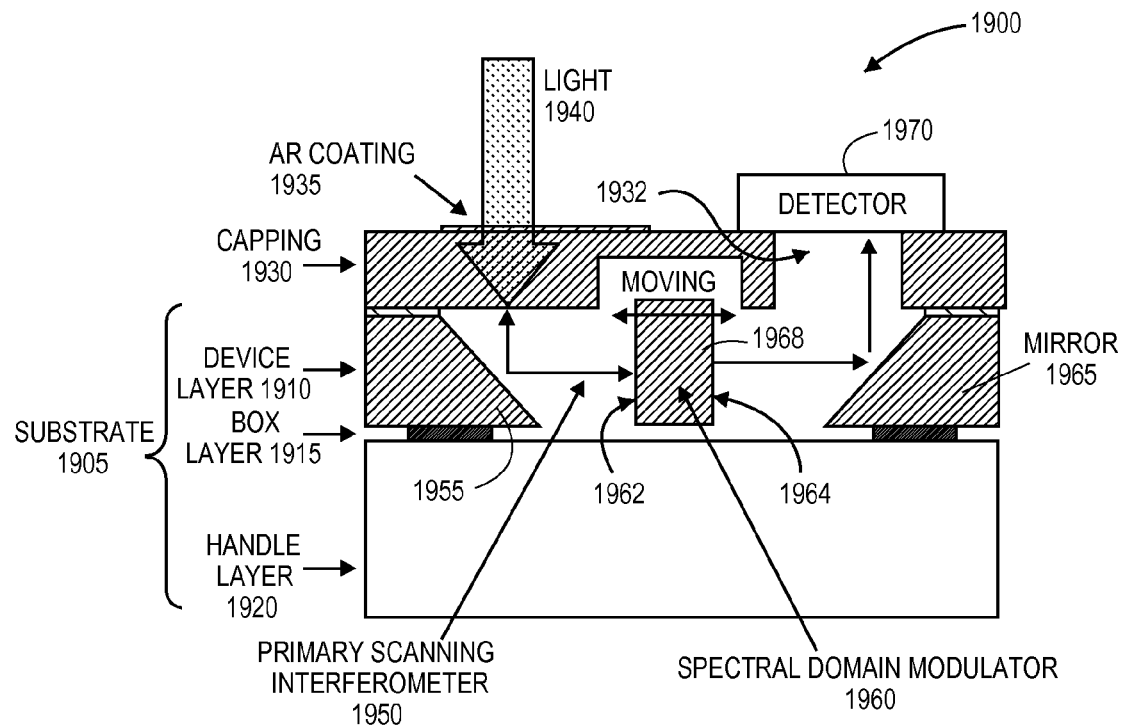
FIGS. 19A and 19B are cross-sectional views of an exemplary spectrometer, in accordance with embodiments of the present invention.
Figure 19B:
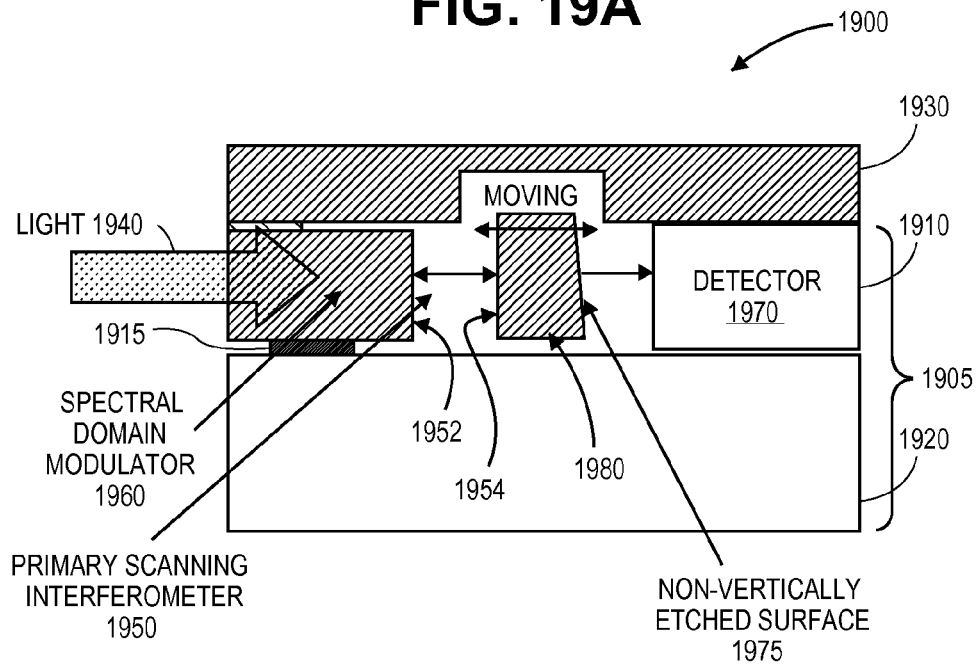

FIGS. 19A and 19B are cross-sectional views of an exemplary spectrometer fabricated using, for example, silicon-on-insulator (SOI) optical bench technology, in accordance with embodiments of the present invention. In FIGS. 19A and 19B, a spectrometer 1900 including a primary scanning interferometer 1950 and a spectral domain modulator 1960 can be fabricated on a substrate or wafer 1905, such as silicon-on-insulator (SOI) wafer or another type of wafer (e.g., plastic, glass, etc.). The substrate 1905 may include, for example, a handle layer 1920, a device layer 1910 and an etch stop or sacrificial (e.g., buried oxide (BOX)) layer 1915. A capping layer 1930 overlies the device layer 1910 of the substrate 1905.

In an exemplary embodiment, the primary scanning interferometer 1950 and spectral domain modulator 1960 are formed within the device layer 1910. Thus, the optical paths of the primary scanning interferometer 1950 and spectral domain modulator 1960 are parallel to the plane of the substrate 1905 and lie within the substrate 1905. In addition, one or more MEMS actuators (not shown) may be formed in the device layer 1910 and/or the handle layer 1920 to cause in-plane or out-of-plane displacement of any moveable components in the primary scanning interferometer 1950 and the spectral domain modulator 1960.

In the embodiment shown in FIG. 19A, the capping layer 1930 has an anti-reflection (AR) coating 1935 on a top surface thereof. Light 1940 (i.e., a wideband source spectrum) is injected through the AR coating 1935 and capping layer 1930 to the device layer 1910, where it is subjected to the primary scanning interferometer 1950 formed from the bottom surface of the capping layer 1930 and a moving dielectric mirror 1962 (silicon-air interface of a surface of the spectral domain modulator 1960), with an inclined dielectric mirror 1955 in between. Upon exiting the primary scanning interferometer 1950, the light is then subjected to the spectral domain modulator 1960 formed by parallel surfaces 1962 and 1964 of a silicon portion 1968 of the device layer 1910. The light is then reflected to the top surface of the capping layer 1930 to the detector 1970 through an opening 1932 in the capping layer 1930 using another inclined dielectric mirror 1965.

In the embodiment shown in FIG. 19B, the light 1940 is injected from one of the sides of the substrate 1905 and passes through the spectral domain modulator 1960 to the primary scanning interferometer 1950 formed between opposing parallel dielectric mirror surfaces 1952 and 1954 of the spectral domain modulator 1960 and a moveable silicon portion 1980 of the device layer 1910. The output of the primary scanning interferometer 1950 is then input to the detector 1970, which is inserted into the device layer 1910 so as to lie in the optical path of the primary scanning interferometer 1950. In this embodiment, the surfaces 1954 and 1975 of the moveable silicon portion 1980 do not need to be perfectly parallel to avoid additional modulation after the primary scanning interferometer 1950. Such a configuration of surface 1975 can be a natural result from deep silicon etching using a non-optimized etching process.

In either of the embodiments shown in FIGS. 19A and 19B, the primary scanning interferometer 1950, the spectral domain modulator 1960, one or more MEMS actuators and one or more grooves for the insertion of an optical fiber and/or optical detector 1970 can be monolithically integrated and self-aligned within the substrate 1905 using, for example, deep silicon etching technology (i.e., Deep Reactive Ion Etching (DRIE)) or a surface micromachining technique. In addition, various post-processing procedures can be performed on the surfaces after etching, such as smoothing and annealing.

It should be noted that the SOI embodiments shown in FIGS. 19A and 19B are merely illustrative, and the disclosure is not limited to any particular arrangement or configuration of the components of the spectrometer 1900. For example, SOI bench technology may be used to fabricate any of the above described spectrometer arrangements and/or configurations shown in FIGS. 5-14 or any other spectrometer arrangement and/or configuration including both a spectral domain modulator and primary interferometer.

Figure 20A:
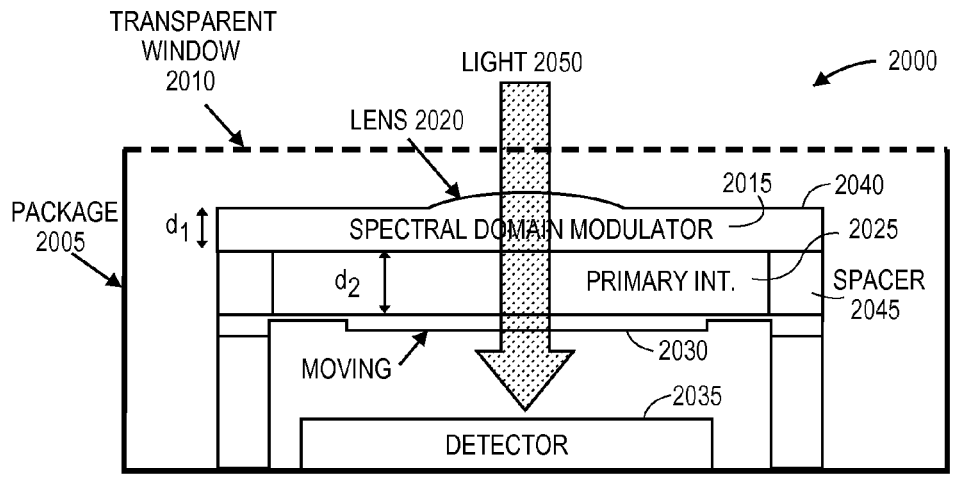
FIGS. 20A-20C are cross-sectional views of another exemplary spectrometer, in accordance with embodiments of the present invention.
Figure 20B:
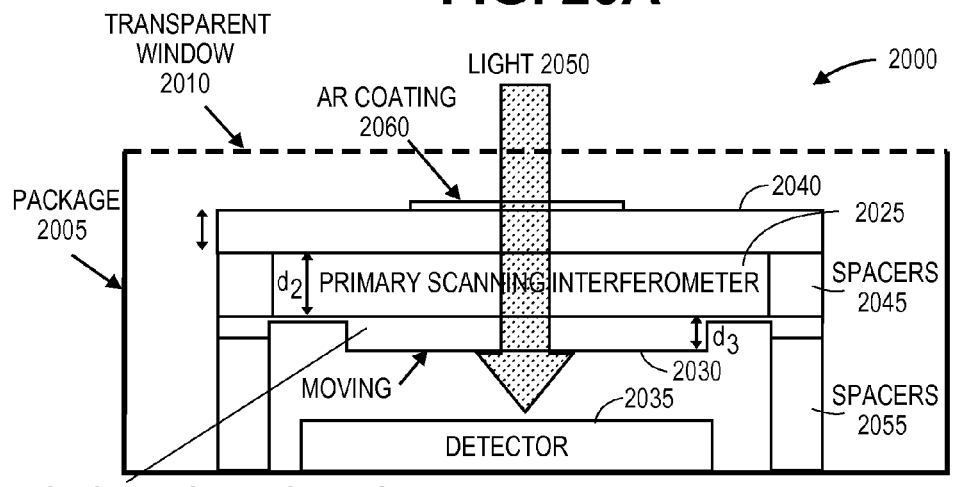
Figure 20C:
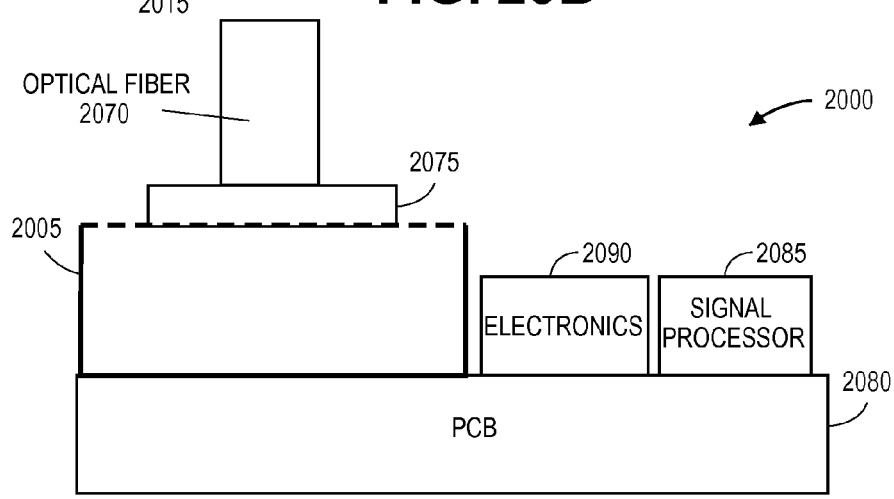

FIGS. 20A-20C are cross-sectional views of another exemplary spectrometer 2000 fabricated from silicon and integrated with standard detectors 2035, in accordance with embodiments of the present invention. As can be seen in FIGS. 20A and 20B, the spectrometer 1000 includes a spectral domain modulator 2015, primary interferometer 2025, and detector 2035 within a package 2005. The package 2005 has a transparent window 2010 through which light 2050 (i.e., wideband source spectrum) can enter.

In the embodiment shown in FIG. 20A, the light 2060 is then collimated and collected by a silicon micro lens 2020 fabricated on a silicon substrate 2040. The substrate 2040 is used as the spectral domain modulator 2015. In one embodiment, the substrate 2040 is double side smooth and its thickness ($d_1$) is controlled. The light is modulated in the spectral domain modulator 2015 and then propagates to the primary scanning interferometer 2025. The primary interferometer 2025 includes an air cavity formed by the bottom of substrate 2040 and a silicon micro mirror 2030, separated by spacers 2045. The mirror 2030 is attached to a MEMS actuator (not shown) and is displaced perpendicular to the light path to vary the width ($d_2$) of the air cavity. The light is then allowed to propagate though the mirror 2030 to the detector 2035. In other embodiments, the mirror 2030 may be allowed to function as a second auxiliary interferometer, further modulating the light spectrum if the mirror 2030 has two parallel optical surfaces. If the bottom surface of the mirror 2030 is not parallel to the top surface of the mirror 2030, or if the bottom surface is anti-reflective coated, the light will pass through the mirror without further modulation.

In the embodiment shown in FIG. 20B, the lens is replaced by an anti-reflective coated surface 2060 on the substrate 2040 and the mirror 2030 has a controlled thickness ($d_3$) that enables the mirror 2030 to act as the spectral domain modulator 2015. In FIGS. 20A and 20B, the spectral domain modulator 2015 and primary interferometer 2025 are collectively mounted on the head of a standard detector 2035 using additional spacers 2055. This arrangement is very compact and can be attached on a printed circuit board (PCB), as shown in FIG. 20C. The electronics 2090 for actuating the MEMS actuator and processing the detector output signal can also be attached on the PCB 2090 together with the signal processor 2085. In other embodiments, the signal processing block can be replaced by a personal computer (not shown) connected to the PCB 2090. The analyzed light can be supplied though an optical fiber 2070 fixed to the package 2005 via a connector 2075.

Figure 21A:
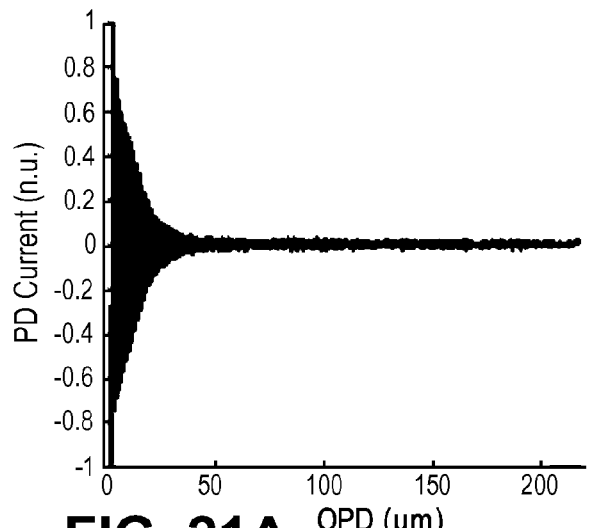
FIGS. 21A-21C illustrate recorded interferograms and a resulting spectrum from a Fourier transform thereof.
Figure 21B:
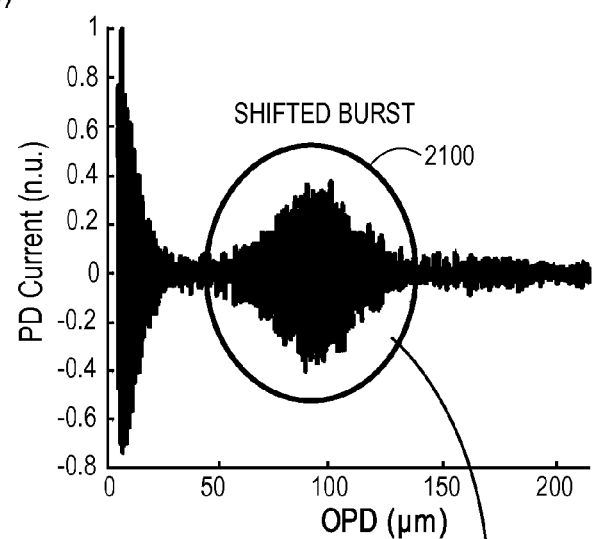
Figure 21C:
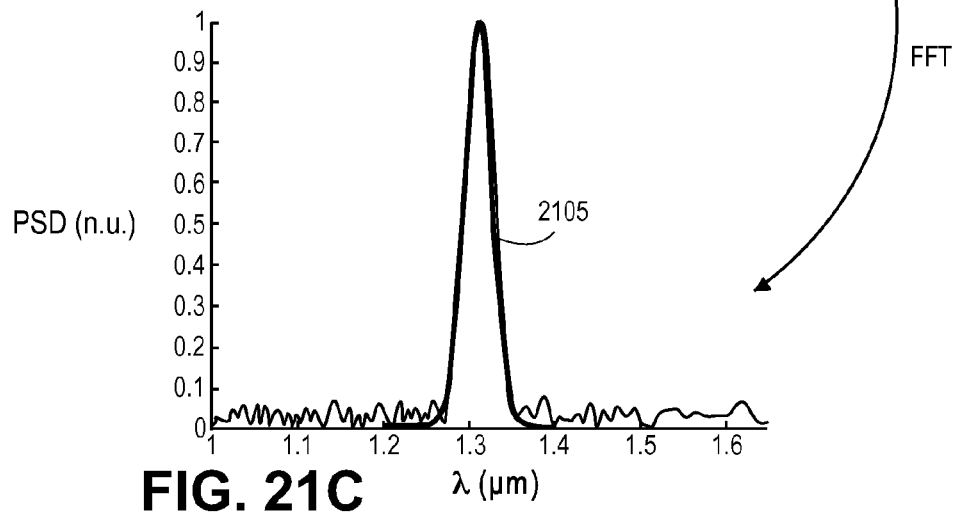

Referring now to FIGS. 21A-21C, various recorded interferograms and a resulting spectrum are illustrated. In FIG. 21A, a recorded interferogram of a spectrometer without the insertion of an auxiliary interferometer (spectral domain modulator) is shown, while in FIG. 21B, a recorded interferogram with the insertion of an auxiliary interferometer is shown. As can be seen in FIG. 21A, the original interferogram without the secondary interferometer is one-sided. As can further be seen in FIG. 21B, the modified interferogram obtained by inserting an auxiliary FP interferometer has a double-sided shifted burst 2100. Applying a FFT on this burst leads to the spectrum 2105 shown in FIG. 21C.

Figure 22:
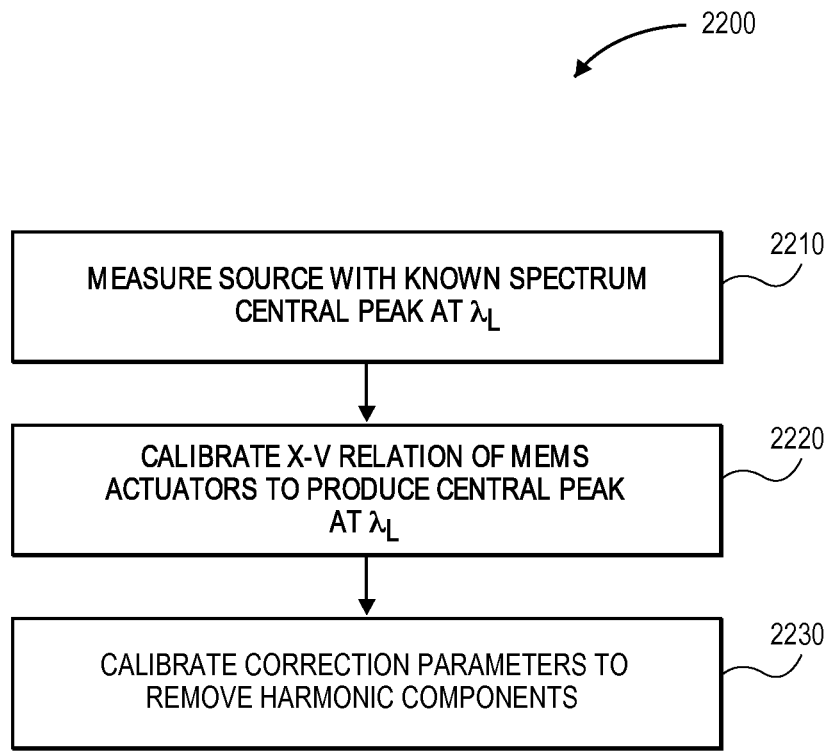
FIG. 22 is a flowchart illustrating an exemplary process for calibrating a spectrometer, in accordance with embodiments of the present invention.

FIG. 22 illustrates an exemplary method 2200 for calibrating a spectrometer, in accordance with embodiments of the present invention. The method 2200 shown in FIG. 22 may be implemented, for example, by the pre-transform correction algorithm module 262, Fourier transform module 264 and/or the post-transform correction algorithm module 266 shown in FIG. 2. The method 2200 begins at block 2210 with measuring a source spectrum (i.e., a laser) with a known spectrum central peak around $\lambda_L$. At block 2220, the MEMS actuator x–v (or other) relation is calibrated such that the fundamental central peak is at the correct location ($\lambda_L$). Finally, at block 2230, one or more correction parameters are calibrated to null or minimize the harmonics.

In an exemplary embodiment, the interferogram may need to be corrected from harmonics, for example, when a multiple beam interferometer is used as a primary interferometer. Referring again to equation (4) above, the transmission function in equation (4) can be expressed in terms of a Taylor expansion (or Fourier series):

$$T = a_o + a_1 \cos\left(\frac{2\pi}{\lambda} OPD\right) + a_2 \cos\left(2\frac{2\pi}{\lambda} OPD\right) + \ldots \quad (7)$$

It can be proven that the measured interferogram $I_m$(OPD) in this case will be related to the original interferogram $I_o$(OPD) that would be obtained from a pure cosine function, by:

$$I_m(OPD) = a_1 I_o(OPD) + a_2 I_o(2OPD) + \ldots \quad (8)$$

The relation between the original interferogram and the measured interferogram can then be represented by the set of equations:

$$I_o(OPD) = \frac{1}{a_1} I_m(OPD) - \frac{a_2}{a_1} I_o(2OPD) - \ldots \quad (9)$$

$$I_o(2OPD) = \frac{1}{a_1} I_m(2OPD) - \frac{a_2}{a_1} I_o(4OPD) - \ldots \quad (10)$$

Substituting from (10) into (9) results in:

$$I_o(OPD) = \frac{1}{a_1} I_m(OPD) - \frac{a_2}{a_1}\left[\frac{1}{a_1} I_m(2OPD) - \frac{a_2}{a_1} I_o(4OPD) - \ldots\right] - \ldots \quad (11)$$

$$\approx \frac{1}{a_1} I_m(OPD) - \frac{a_2}{a_1^2} I_m(2OPD)$$

Thus, the original interferogram at a given optical path difference (OPD) is given by the measured interferogram at the same OPD, but corrected with the measured interferogram at twice the OPD. The correction algorithm described herein was illustrated for the second order errors. It should be understood that the same algorithm can be applied for thirds and higher order errors when these terms are considered in the equations. For example, the equation can have the general form of:

$$I_o(OPD) = c_1 I_m(OPD) + c_2 I_m(2OPD) + c_3 I_m(3OPD) + c_4 I_m(4OPD) + c_6 I_m(6OPD) + \ldots \quad (12)$$

where $c_1, c_2, \ldots$ are correction parameters used to cancel the harmonics. It is these correction parameters that are calibrated (i.e., determined) in block 2230.

As mentioned above, the harmonics correction can also be done in the spectral domain after the Fourier transform (i.e., in the post-transform correction algorithm module), This is based on the fact even if $\lambda_{min} < \lambda_{max}/N$ where N is an integer, the retrieved spectrum with harmonics will contain correct (harmonics-free) portion at least for a small portion close to $\lambda_{max}$. This portion is then used in a recursive manner to get the correct spectrum at smaller wavelengths according to the relation:

$$I_o(\lambda_i) = \frac{1}{a_1} I_m(\lambda_i) - \frac{a_2}{a_1} I_o(2\lambda_i) - \frac{a_3}{a_1} I_o(3\lambda_i) - \ldots \quad (13)$$

where $i = n, n-1, n-2, \ldots, 1$ and n is the total number of points in the spectral domain. It should be noted that for the start of the recursion, a portion of the spectrum for large wavelengths is already correct because $I_o(2\lambda, 3\lambda, \ldots)$ is zero. In this manner, the correction block is placed after the Fourier transform and called post-transform correction.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A spectrometer, comprising:
   a primary interferometer including at least one moveable element, the primary interferometer optically coupled to receive a wideband source spectrum and operable to direct the wideband source spectrum along an optical path so as to produce an interference pattern;
   an actuator coupled to the at least one moveable element to cause a displacement of the at least one moveable element to vary the optical path;
   an optical detector optically coupled to detect an interferogram produced as a result of the interference pattern and the displacement of the at least one moveable element;
   a spectral domain modulator including an auxiliary interferometer coupled to the primary interferometer and having a periodic response in the spectral domain to modulate the wideband source spectrum, the spectral domain modulator operable to cause one or more shifted bursts in the interferogram, a number of shifted bursts and an amount of shift in each of the shifted bursts being determined based on the periodic response of the spectral domain modulator; and
   processing circuitry coupled to the optical detector to receive the interferogram including the one or more shifted bursts, the processing circuitry configured to:
      determine a measured spectrum using a mathematical transform of the interferogram;
      calibrate motion of the at least one moveable element to produce a corrected spectrum from the measured spectrum; and
      minimize harmonics in the corrected spectrum caused by the spectral domain modulator;
   wherein the auxiliary interferometer and the primary interferometer are Fabry-Perot interferometers;
   wherein the auxiliary interferometer is formed within a first dielectric portion between a first surface and a second surface of the first dielectric portion, the second surface being opposite the first surface;
   wherein the primary interferometer is formed in air between the second surface of the first dielectric portion and a third surface of a second dielectric portion, the second dielectric portion being separate from the first dielectric portion;
   wherein the first dielectric portion and the second dielectric portion each include a respective piece of dielectric material and each of the first dielectric portion and the second dielectric portion are separate from other optical components in the optical path.

2. The spectrometer of claim 1, wherein the wideband source spectrum has an original bandwidth and further comprising:
   a filter configured to limit the original bandwidth of the wideband source spectrum to a filtered bandwidth, the filter having a passband satisfying a condition that a minimum wavelength of the filtered bandwidth is greater than half of a maximum wavelength of the filtered bandwidth;
   wherein a spectral range of the spectrometer is defined by the passband of the filter;
   wherein a resolution of the spectrometer is determined by a travel range of the actuator.

3. The spectrometer of claim 1, wherein an auxiliary optical path length of the auxiliary interferometer is continuously varied during operation of the spectrometer to vary the periodic response of the auxiliary interferometer and to produce dynamically shifted bursts in the interferogram of the primary interferometer.

4. The spectrometer of claim 1, wherein the spectral domain modulator includes at least two auxiliary interferometers.

5. The spectrometer of claim 1, wherein each of the primary interferometer and the auxiliary interferometer is an intrinsic fiber Fabry-Perot interferometer or an extrinsic fiber Fabry-Perot interferometer.

6. The spectrometer of claim 1, wherein at least one of the primary interferometer and the auxiliary interferometer includes one or more silicon mirrors such that the corresponding Fabry-Perot interferometer has a coefficient of finesse between two and four.

7. The spectrometer of claim 1, further comprising an optical fiber, and wherein:
the second surface of the first dielectric portion is parallel to the first surface;
the first surface of the first dielectric portion is optically coupled to the optical fiber;
the second dielectric portion has a fourth surface opposite the third surface, the third surface being further opposite the second surface;
the third surface and the fourth surface of the second dielectric portion are not parallel; and
the first dielectric portion or the second dielectric portion is coupled to the actuator.

8. The spectrometer of claim 1, wherein the spectral domain modulator includes at least two auxiliary interferometers, the primary interferometer and the at least two auxiliary interferometers being cascaded in series in the optical path.

9. The spectrometer of claim 1, further comprising:
at least one additional actuator coupled to the auxiliary interferometer to vary an interference path of the auxiliary interferometer.

10. The spectrometer of claim 1, wherein the actuator is a Micro Electro-Mechanical Systems (MEMS) actuator.

11. A spectrometer, comprising:
a primary interferometer including at least one moveable element, the primary interferometer optically coupled to receive a wideband source spectrum and operable to direct the wideband source spectrum along an optical path so as to produce an interference pattern;
an actuator coupled to the at least one moveable element to cause a displacement of the at least one moveable element to vary the optical path;
an optical detector optically coupled to detect an interferogram produced as a result of the interference pattern and the displacement of the at least one moveable element;
a spectral domain modulator including an auxiliary interferometer coupled to the primary interferometer and having a periodic response in the spectral domain to modulate the wideband source spectrum, the spectral domain modulator operable to cause one or more shifted bursts in the interferogram, a number of shifted bursts and an amount of shift in each of the shifted bursts being determined based on the periodic response of the spectral domain modulator; and
processing circuitry coupled to the optical detector to receive the interferogram including the one or more shifted bursts and configured to:
determine a measured spectrum using a mathematical transform of the interferogram;
calibrate motion of the at least one moveable element to produce a corrected spectrum from the measured spectrum; and
minimize harmonics in the corrected spectrum caused by the spectral domain modulator.

12. The spectrometer of claim 11, wherein the processing circuitry includes a pre-transform correction module for calibrating one or more correction parameters prior to applying a Fourier transform to the interferogram, the correction parameters being used to null harmonics in the corrected spectrum using an equation having the form:

$$I_o(OPD) = c_1 I_m(OPD) + c_2 I_m(2OPD) + c_3 I_m(3OPD) + c_4 I_m(4OPD) + c_6 I_m(6OPD) + \ldots,$$

where $I_o(OPD)$ is an original interferogram at a given optical path difference (OPD), $I_m(OPD)$ is a measured interferogram at the given OPD and $c_2, c_3, c_4, c_6$ are the correction parameters given by $c_1 = 1/a_1$, $c_2 = a_2/a_1^2$, $c_3 = a_3/a_1^2$, $c_4 = a_4/a_1^2 \ldots$, and $a_1, a_2, a_3, a_4$ are Fourier series expansion coefficients of an Airy function of the primary and auxiliary interferometers.

13. The spectrometer of claim 11, wherein the processing circuitry includes a post-transform correction module for recursively nulling harmonics in the corrected spectrum using a correct portion of the corrected spectrum by applying an equation having the form:

$$I_o(\lambda_i) = \frac{1}{a_1} I_m(\lambda_i) - \frac{a_2}{a_1} I_o(2\lambda_i) - \frac{a_3}{a_1} I_o(3\lambda_i) - \ldots,$$

where $I_o(\lambda_i)$ is an original interferogram at a given wavelength $(\lambda_i)$, $I_m(\lambda_i)$ is a measured interferogram at the given wavelength and $a_1, a_2, a_3$ are Fourier series expansion coefficients of an Airy function of the primary and auxiliary interferometers.

14. The spectrometer of claim 11, wherein the auxiliary interferometer and the primary interferometer are each configured to operate in one of a transmission mode and a reflection mode using one or more directional couplers or circulators.

15. The spectrometer of claim 11, wherein each of the primary interferometer and the auxiliary interferometer include one or more of a Michelson interferometer, a Mach-Zehnder interferometer or a Fabry-Perot interferometer.

16. The spectrometer of claim 11, wherein at least one of the primary interferometer and the auxiliary interferometer is a Fabry-Perot interferometer.

17. The spectrometer of claim 16, wherein both the primary interferometer and the auxiliary interferometer are Fabry-Perot interferometers and further comprising:
a first optical fiber;
a dielectric portion having a first surface and a second surface opposite to the first surface, the first surface being coupled to the first optical fiber;
a second optical fiber coupled to the second surface of the dielectric portion on a first end of the second optical fiber; and
a moveable mirror optically coupled to a second end of the second optical fiber via an air cavity, the moveable mirror being the at least one moveable element coupled to the actuator;
wherein the auxiliary interferometer is formed between the first and second surfaces of the dielectric portion;
wherein the primary interferometer is formed between the moveable mirror and an interface between the second end of the second optical fiber and the air cavity.

18. The spectrometer of claim 11, wherein the primary interferometer and the auxiliary interferometer include a coupled cavity shared between the primary interferometer and the auxiliary interferometer.

19. The spectrometer of claim 11, wherein the optical path includes a first optical path in the primary interferometer and a second optical path in the auxiliary interferometer, and the actuator is operable to vary the first optical path and the second optical path simultaneously and oppositely.

20. The spectrometer of claim 19, wherein both the primary interferometer and the auxiliary interferometer are Fabry-Perot interferometers and further comprising:
   a first dielectric portion having a first surface and a second surface opposite the first surface;
   a second dielectric portion separate from the first dielectric portion, the second dielectric portion having a third surface and a fourth surface opposite the third surface, the third surface being further opposite the second surface; and
   a third dielectric portion separate from the first dielectric portion and the second dielectric portion, the third dielectric portion having a fifth surface and a sixth surface opposite the fifth surface, the fifth surface being further opposite the fourth surface;
   wherein the auxiliary interferometer is formed between the second surface and the third surface;
   wherein the primary interferometer is formed between the fourth surface and the fifth surface;
   wherein the second dielectric portion is coupled to the actuator such that movement of the actuator varies the first optical path and the second optical path simultaneously and oppositely.

21. The spectrometer of claim 19, wherein both the primary interferometer and the auxiliary interferometer are Fabry-Perot interferometers and further comprising:
   an optical fiber;
   a first dielectric portion having a first surface and a second surface opposite the first surface, the first surface being optically coupled to the optical fiber via an air cavity; and
   a second dielectric portion separate from the first dielectric portion, the second dielectric portion having a third surface and a fourth surface opposite the third surface, the third surface being further opposite the second surface
   wherein the auxiliary interferometer is formed between the first surface and an interface between the optical fiber and the air cavity;
   wherein the primary interferometer is formed between the second surface and the third surface;
   wherein the first dielectric portion is coupled to the actuator such that movement of the actuator varies the first optical path and the second optical path simultaneously and oppositely.

22. The spectrometer of claim 11, further comprising:
   at least one additional actuator coupled to the auxiliary interferometer to selectively insert the auxiliary interferometer into the optical path.

23. The spectrometer of claim 11, wherein the spectral domain modulator includes at least two auxiliary interferometers configured in parallel in the optical path such that each of the at least two auxiliary interferometers receives a different portion of the wideband source spectrum.

24. The spectrometer of claim 11, wherein the actuator is a Micro Electro-Mechanical Systems (MEMS) actuator and further comprising:
   a substrate having the primary interferometer, the MEMS actuator, one or more grooves for insertion of an optical fiber or the optical detector, and the spectral domain modulator monolithically-integrated and self-aligned therein using a deep etching technique or a surface micromachining technique.

25. The spectrometer of claim 24, wherein the substrate is a silicon-on-insulator wafer.

26. The spectrometer of claim 25, further comprising:
   a capping layer, and wherein:
   the substrate includes a handle layer, a device layer and a sacrificial layer between the handle layer and the device layer, the capping layer being adjacent to the device layer;
   the primary interferometer and the spectral domain modulator are fabricated within the device layer;
   the device layer includes an inclined silicon mirror and a moveable component, the moveable component including a moveable silicon portion having at least one surface in the plane of the substrate;
   the inclined silicon mirror being optically coupled to receive the wideband source spectrum through the capping layer and to reflect the wideband source spectrum in-plane with the substrate;
   the spectral domain modulator including the moveable silicon portion; and
   the optical detector is coupled to a top surface of the capping layer and is configured to receive the interference pattern through an opening in the capping layer via a second inclined silicon mirror in the device layer.

27. The spectrometer of claim 25, wherein:
   the substrate includes a handle layer, a device layer and a sacrificial layer between the handle layer and the device layer;
   the primary interferometer and the spectral domain modulator are fabricated within the device layer;
   the spectral domain modulator includes a first silicon portion that is optically coupled to receive the wideband source spectrum in the plane of the substrate and to direct a modulated wideband source spectrum to the primary interferometer;
   the primary interferometer is formed between a first surface of the first silicon portion and a second surface of a second silicon portion, the second silicon portion forming the at least one moveable element; and
   the optical detector is optically coupled to receive the interference pattern from the second silicon portion.

28. The spectrometer of claim 25, further comprising:
   a refractive optical element located above the substrate; and wherein:
   the at least one moveable element includes a silicon portion coupled to the actuator, the actuator being configured to displace the silicon portion perpendicular to the optical path of the wideband source spectrum;
   the primary interferometer includes an air cavity formed between the refractive element and the silicon portion;
   the refractive element is optically coupled to receive the wideband source spectrum propagating out-of-plane with the substrate, the refractive element is further optically coupled to direct a modulated wideband source spectrum to the primary interferometer; and the interference pattern propagating through the silicon portion to the optical detector located below the substrate.

* * * * *